US012607870B2

(12) United States Patent (10) Patent No.: US 12,607,870 B2
Yeoh et al. (45) **Date of Patent: \*Apr. 21, 2026**

(54) DYNAMICALLY ACTUABLE DIFFRACTIVE OPTICAL ELEMENT

(71) Applicant: Magic Leap, Inc., Plantation, FL (US)

(72) Inventors: Ivan Li Chuen Yeoh, Tampa, FL (US); Lionel Ernest Edwin, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 349 days.

This patent is subject to a terminal disclaimer.

(21) Appl. No.: 18/388,104

(22) Filed: Nov. 8, 2023

(65) Prior Publication Data

US 2024/0077741 A1     Mar. 7, 2024

Related U.S. Application Data

(60) Continuation of application No. 17/243,100, filed on Apr. 28, 2021, now Pat. No. 11,852,841, which is a
(Continued)

(51) Int. Cl.
  G02B 27/42     (2006.01)
  G02B 5/18     (2006.01)
  (Continued)

(52) U.S. Cl.
  CPC ....... G02B 27/4205 (2013.01); G02B 5/1814 (2013.01); G02B 5/1828 (2013.01);
  (Continued)

(58) Field of Classification Search
  CPC .............. G02B 27/4205; G02B 5/1814; G02B 5/1828; G02B 26/004; G02B 26/0808;
  (Continued)

(56) References Cited

U.S. PATENT DOCUMENTS

| | | | |
|---|---|---|---|
| 7,184,615 B2 | 2/2007 | Levola | |
| 7,760,066 B2 | 7/2010 | Takeda | |

(Continued)

FOREIGN PATENT DOCUMENTS

| | | |
|---|---|---|
| CN | 106030376 A | 10/2016 |
| CN | 106597658 A | 4/2017 |

(Continued)

OTHER PUBLICATIONS

Lei et al. "Diffraction Patterns of a Water-Submerged Superhydrophobic Grating under Pressure" Langmuir 2010, 26(5), 3666-3669L (Year: 2010).*

(Continued)

*Primary Examiner* — George G. King
(74) *Attorney, Agent, or Firm* — KILPATRICK TOWNSEND & STOCKTON LLP

(57) ABSTRACT

A dynamically actuable lens includes a substrate having a surface and a metasurface diffractive optical element (DOE) formed on the surface. The metasurface DOE includes a plurality of raised portions and defines a plurality of recesses between adjacent raised portions. The dynamically actuable lens also includes a movable cover overlying the metasurface DOE and comprising a hydrophilic material, a quantity of a fluid disposed on the movable cover, and a drive mechanism coupled to the movable cover. The drive mechanism is configured to move the movable cover toward the metasurface DOE to displace a portion of the quantity of the fluid into the plurality of recesses, thereby rendering the metasurface DOE in an "off" state, and move the movable cover away from the metasurface DOE, causing the portion of the quantity of the fluid retracting from the plurality of recesses, thereby rendering the metasurface DOE in an "on" state.

20 Claims, 27 Drawing Sheets

Related U.S. Application Data division of application No. 16/011,295, filed on Jun. 18, 2018, now Pat. No. 11,022,798.

(60) Provisional application No. 62/521,804, filed on Jun. 19, 2017.

(51) Int. Cl.

| | |
|---|---|
| *G02B 26/00* | (2006.01) |
| *G02B 26/08* | (2006.01) |
| *G02B 27/01* | (2006.01) |
| G02B 27/00 | (2006.01) |
| G02B 27/09 | (2006.01) |
| G02B 27/44 | (2006.01) |

(52) U.S. Cl.
CPC ....... *G02B 26/004* (2013.01); *G02B 26/0808* (2013.01); *G02B 27/0172* (2013.01); *G02B 27/4272* (2013.01); *G02B 26/005* (2013.01); *G02B 27/0081* (2013.01); *G02B 2027/0112* (2013.01); *G02B 2027/0178* (2013.01); *G02B 27/0944* (2013.01); *G02B 27/44* (2013.01)

(58) Field of Classification Search
CPC ........... G02B 27/0172; G02B 27/4272; G02B 26/005; G02B 27/0081; G02B 27/0944; G02B 27/44; G02B 2027/0112; G02B 2027/0178; G02B 2027/0123; G02B 5/18; G02B 30/24
See application file for complete search history.

(56) References Cited

U.S. PATENT DOCUMENTS

| | | | |
|---|---|---|---|
| 8,582,115 | B2 | 11/2013 | Gao et al. |
| 8,681,423 | B1 | 3/2014 | Gibson et al. |
| 11,022,798 | B2 | 6/2021 | Yeoh et al. |
| 11,852,841 | B2 | 12/2023 | Yeoh et al. |
| 2003/0020915 | A1 | 1/2003 | Schueller et al. |
| 2005/0281503 | A1 | 12/2005 | Hendriks et al. |
| 2006/0228108 | A1 | 10/2006 | Viinikanoja et al. |
| 2009/0316122 | A1 | 12/2009 | Prosyentsov et al. |
| 2012/0086949 | A1 | 4/2012 | Gao et al. |
| 2013/0287607 | A1 | 10/2013 | Kuznetsov |
| 2014/0140654 | A1 | 5/2014 | Brown et al. |
| 2015/0016777 | A1 | 1/2015 | Abovitz et al. |
| 2015/0178939 | A1 | 6/2015 | Bradski et al. |
| 2016/0327789 | A1 | 11/2016 | Klug et al. |
| 2017/0097507 | A1 | 4/2017 | Yeoh et al. |
| 2019/0028564 | A1 | 1/2019 | Singamsetty et al. |

FOREIGN PATENT DOCUMENTS

| | | | |
|---|---|---|---|
| EP | 0315443 | A1 | 5/1989 |
| JP | 5865381 | A | 4/1983 |
| JP | 2006500618 | A | 1/2006 |
| JP | 2010004040 | A | 1/2010 |
| KR | 101965702 | B1 | 4/2019 |
| WO | 2004027490 | A1 | 4/2004 |
| WO | 2005096029 | A1 | 10/2005 |

OTHER PUBLICATIONS

EP18821316.9, "Intention to Grant", Aug. 21, 2025, 7 pages.

U.S. Appl. No. 16/011,295, Final Office Action mailed on Oct. 8, 2020, 22 pages.

U.S. Appl. No. 16/011,295, First Action Interview Office Action Summary mailed on Jul. 14, 2020, 7 pages.

U.S. Appl. No. 16/011,295, First Action Interview Pilot Program Pre-Interview Communication mailed on Jun. 22, 2020, 5 pages.

U.S. Appl. No. 16/011,295, Notice of Allowance mailed on Feb. 3, 2021, 14 pages.

U.S. Appl. No. 17/243,100, Final Office Action mailed on May 2, 2023, 13 pages.

U.S. Appl. No. 17/243,100, Non-Final Office Action mailed on Nov. 2, 2022, 13 pages.

U.S. Appl. No. 17/243,100, Notice of Allowance mailed on Aug. 15, 2023, 12 pages.

Australian Application No. 2018288698, First Examination Report mailed on Mar. 21, 2023, 3 pages.

Chinese Application No. 201880040510.8, Office Action and English translation mailed on Dec. 21, 2023, 11 pages.

European Application No. 18821316.9, Extended European Search Report mailed on May 13, 2020, 9 pages.

European Application No. 18821316.9, Office Action mailed on Mar. 3, 2022, 8 pages.

European Application No. 18821316.9, Office Action mailed on Feb. 5, 2024, 9 pages.

Israel Application No. 271390, Office Action mailed on Oct. 25, 2022, 4 pages.

Indian Application No. 201947049971, First Examination Report mailed on Feb. 24, 2022, 7 pages.

Japanese Application No. 2019-569930, Notice of Allowance mailed on Jun. 14, 2023, 3 pages. [no translation available].

Japanese Application No. 2019-569930, Office Action mailed and English translation on Aug. 3, 2022, 12 pages.

Japanese Application No. 2019-569930, Office Action and English translation mailed on Dec. 23, 2022, 13 pages.

Korean Application No. 10-2020-7001439, Office Action and English translation mailed on Apr. 6, 2023, 11 pages.

Korean Application No. 10-2020-7001439, Office Action and English translation mailed on Oct. 12, 2023, 7 pages.

Laser et al., A Review of Micropumps, Journal of Micromechanics and Microengineering, vol. 14, No. 6, Apr. 19, 2004, pp. R35-R64.

International Application No. PCT/US2018/038029, International Preliminary Report on Patentability mailed on Jan. 2, 2020, 12 pages.

International Application No. PCT/US2018/038029, International Search Report and Written Opinion mailed on Oct. 29, 2018, 15 pages.

International Application No. PCT/US2018/038029, Invitation to Pay Additional Fees and, Where Applicable, Protest Fee mailed on Aug. 27, 2018, 2 pages.

Trantidou et al., Hydrophilic Surface Modification of PDMS for Droplet Microfluidics Using a Simple, Quick, and Robust Method via PVA Deposition, Microsystems & Nanoengineering, vol. 3, Available Online at: https://doi.org/10.1038/micronano.2016.91, Apr. 24, 2017, 9 pages.

Il271390, "Office Action", Jan. 14, 2024, 4 pages.

KR10-2020-7001439, "Notice of Decision to Grant", Feb. 2, 2024, 6 pages.

\* cited by examiner

ON

OFF

1500

1560
1550
1540
1530
1520
1510

1542

1544

1900

1860

1930

1840

1900

1810

1820

1930

1840

2060

2050

2010

2700

2710

2720

2730

2740

DYNAMICALLY ACTUABLE DIFFRACTIVE OPTICAL ELEMENT

CROSS-REFERENCES TO RELATED APPLICATIONS

This application is a continuation of U.S. patent application Ser. No. 17/243,100, filed Apr. 28, 2021, entitled "DYNAMICALLY ACTUABLE DIFFRACTIVE OPTICAL ELEMENT," which is a divisional of U.S. patent application Ser. No. 16/011,295, filed Jun. 18, 2018, U.S. Pat. No. 11,022,798, issued Jun. 1, 2021, entitled "DYNAMICALLY ACTUABLE DIFFRACTIVE OPTICAL ELEMENT," which is a non-provisional of and claims the benefit of and priority to U.S. Provisional Patent Application No. 62/521,804, filed Jun. 19, 2017, entitled "DYNAMICALLY ACTUABLE DIFFRACTIVE OPTICAL ELEMENT," the disclosures of which are hereby incorporated by reference in their entirety for all purposes.

FIELD OF THE INVENTION

The invention pertains to diffraction optical elements and more particularly relates to switchable diffractive optical elements.

BACKGROUND

A diffraction grating is an optical component that deflects light by an angle that is dependent on the wavelength of light and the angle of incidence on the grating. A diffraction grating has a periodic structure with a period that is on the order of the wavelength of light with which is to be used. The periodic structure can be a surface relief profile or a volume modulation of the index of refraction of a transparent material. The operation of diffraction gratings is governed by the grating equation:

$$\theta_m = \arcsin\left(\frac{m\lambda}{d} - \sin(\theta_i)\right)$$

where $\theta_m$ is the angle of light exiting (diffraction angle) the diffraction grating relative to a vector normal to the surface of the grating; $\lambda$ is the wavelength; m is an integer valued parameter known as the "order"; d is the period of the grating; and $\theta_i$ is the angle of incidence of light relative to the vector normal to the surface of the grating.

Gratings may also be blazed, i.e., given a particular periodic profile so as to concentrate the light they diffract into a particular "order" specified by a particular value of the order parameter m. Gratings may be reflective in which case light departs the grating on the same side that light was incident on the grating or predominantly transmissive in which case light exits primarily on a side of the grating opposite from which the light was incident.

The applicant has developed augmented reality systems that include transparent eyepieces that include a plurality of waveguides that couple image-wise modulated light to a user's eyes. Such a system is disclosed in applicant's co-pending U.S. patent application Ser. No. 15/146,296 entitled "Separated Pupil Optical System for Virtual and Augmented Reality and Methods for Displaying Images Using the Same." Optical features that couple light out of the waveguides can be adapted to impart a different diverging field curvature to the exiting light so as to simulate a certain object distance that is beyond the distance of the eyepieces from the user's eye, for example a distance of meters away. (The field curvature may correspond to a spherical wave emanating from a point tens of centimeters or meters away, for example.) Imparting a diverging field curvature to the light emitted by eyepiece triggers the focus mechanism of the human eye to focus at a distance equal to the distance of a virtual point source of spherical waves that would have such a diverging field curvature at the position of the eye and this helps to create a more realistic illusion of virtual 3D objects. Providing a stack of multiple waveguides in which each waveguide has optical feature that impart a different diverging field curvature to exiting light enables improvement of the illusion of virtual 3D objects and also avoid potentially uncomfortable effects resulting from long term use of 3D visualization system in which there is a mismatch between the eye's accommodation cue which is based on the diverging field curvature and other 3D perception cues which indicate distances to objects. Applicant's above referenced pending U.S. patent application discloses a system in which each of a plurality of waveguides has an in-coupling diffraction grating that couples-in light from a source of spatially modulated light (e.g., fiber scanner, 2-D light modulator). The in-coupling gratings are spatially separated, i.e., not overlying each other which requires the source of spatially modulated light to provide spatially modulated light over a wide area. In the case of 2-D light modulator (e.g., LCoS or DLP) the requirement for a wide area of spatially modulated light increase the size and cost of associated optics (e.g., prisms, lens elements) and increase image field size generally leads to degradation of the image quality at the periphery of the image field if not compensated by costly enhancements of the optics. Thus it would be desirable to be able to couple light while eliminating the need for an increase image field size when coupling light into multiple waveguides of an augmented reality eyepiece.

Beyond diffraction gratings, diffractive optical elements provide a lighter weight alternative to conventional reflective and refractive optical elements. Other types of diffractive optical elements include positive and negative diffractive lenses. Recently novel surface relief diffractive lens designs have been developed based on research into metamaterials. Newer metamaterial lenses are similar to traditional diffractive optical elements in that they can include wavelength scale surface relief structures. It would be desirable to provide optical elements that can be switched on and off.

SUMMARY

According to some embodiments, a dynamically actuable diffractive optical element (DOE) includes a substrate having a surface. The surface includes a first region and a second region laterally displaced from the first region. The dynamically actuable DOE further includes a diffraction grating disposed on the first region of the surface of the substrate. The diffraction grating has a first index of refraction, and includes a plurality of ridges and a plurality of grooves between adjacent ridges. The dynamically actuable DOE further includes a quantity of a fluid disposed on the second region of the surface of the substrate. The fluid has a second index of refraction that substantially matches the first index of refraction of the diffraction grating. The dynamically actuable DOE further includes a fluid displacer disposed adjacent the second region of the surface of the substrate, and a drive signal source coupled to the fluid displacer and configured to send an electric signal to the fluid displacer. The electric signal may have a first state and a second state. The fluid displacer is configured to, upon receiving the electric signal in the first state, causing a portion of the quantity of the fluid to be displaced from the second region of the surface into the grooves of the diffraction grating, thereby causing the diffraction grating to be in an "off" state, and upon receiving the electric signal in the second state, causing the portion of the quantity of the fluid to retract from the grooves of the diffraction grating to the second region of the surface, thereby causing the diffraction grating to be in an "on" state.

According to some other embodiments, an eyepiece for projecting image light to an eye of a viewer for forming an image of virtual content includes a first planar waveguide configured to propagate light in a first wavelength range centered at a first wavelength, and a first dynamically actuable diffractive optical element (DOE) formed on a first region of a surface of the first waveguide in a first lateral position and configured to receive the image light incident thereon. The first dynamically actuable DOE includes a surface-relief diffraction grating having a first index of refraction and including a plurality of ridges and a plurality of grooves between adjacent ridges, and a quantity of a fluid disposed on a second region of the surface of the first waveguide adjacent the first region. The fluid has a second index of refraction that substantially matches the first index of refraction of the diffraction grating. The first dynamically actuable DOE further includes a fluid displacer disposed adjacent the second region, and a drive signal source coupled to the fluid displacer and configured to send an electric signal to the fluid displacer. The electric signal may have a first state or a second state. The fluid displacer is configured to, upon receiving the electric signal in the first state, causing a portion of the quantity of the fluid to be displaced from the second region into the grooves of the diffraction grating, thereby causing the diffraction grating to be in an "off" state, and upon receiving the electric signal in the second state, causing the portion of the quantity of the fluid to retract from the grooves of the diffraction grating to the second region, thereby causing the diffraction grating to be in an "on" state. The diffraction grating is configured to diffract a portion of the image light incident thereon into the first waveguide to be propagated therein while in the "on" state, and transmit the image light incident thereon while in the "off" state. The eyepiece further includes a second planar waveguide positioned substantially parallel to a plane of the first waveguide and configured to propagate light in a second wavelength range centered at a second wavelength different from the first wavelength, and a second DOE formed on a region of a surface of the second waveguide in a second lateral position substantially aligned with the first lateral position. The second DOE is configured to receive the image light transmitted by the diffraction grating while the diffraction grating is in the "off" state, and diffract a second portion of the image light into the second waveguide to be propagated therein.

According to some further embodiments, a dynamically actuable lens includes a substrate having a surface, and a metasurface diffractive optical element (DOE) formed on the surface of the substrate. The metasurface DOE includes a plurality of raised portions protruding above the surface, defining a plurality of recesses between adjacent raised portions. The dynamically actuable lens further includes a movable cover overlying the metasurface DOE and comprising a hydrophilic material, a quantity of a fluid disposed on the movable cover, and a drive mechanism coupled to the movable cover. The drive mechanism is configured to, upon receiving a control signal in a first state, move the movable cover toward the metasurface DOE to displace a portion of the quantity of the fluid into the plurality of recesses, thereby rendering the metasurface DOE in an "off" state, and upon receiving a control signal in a second state, move the movable cover away from the metasurface DOE, causing the portion of the quantity of the fluid retracting from the plurality of recesses, thereby rendering the metasurface DOE in an "on" state.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
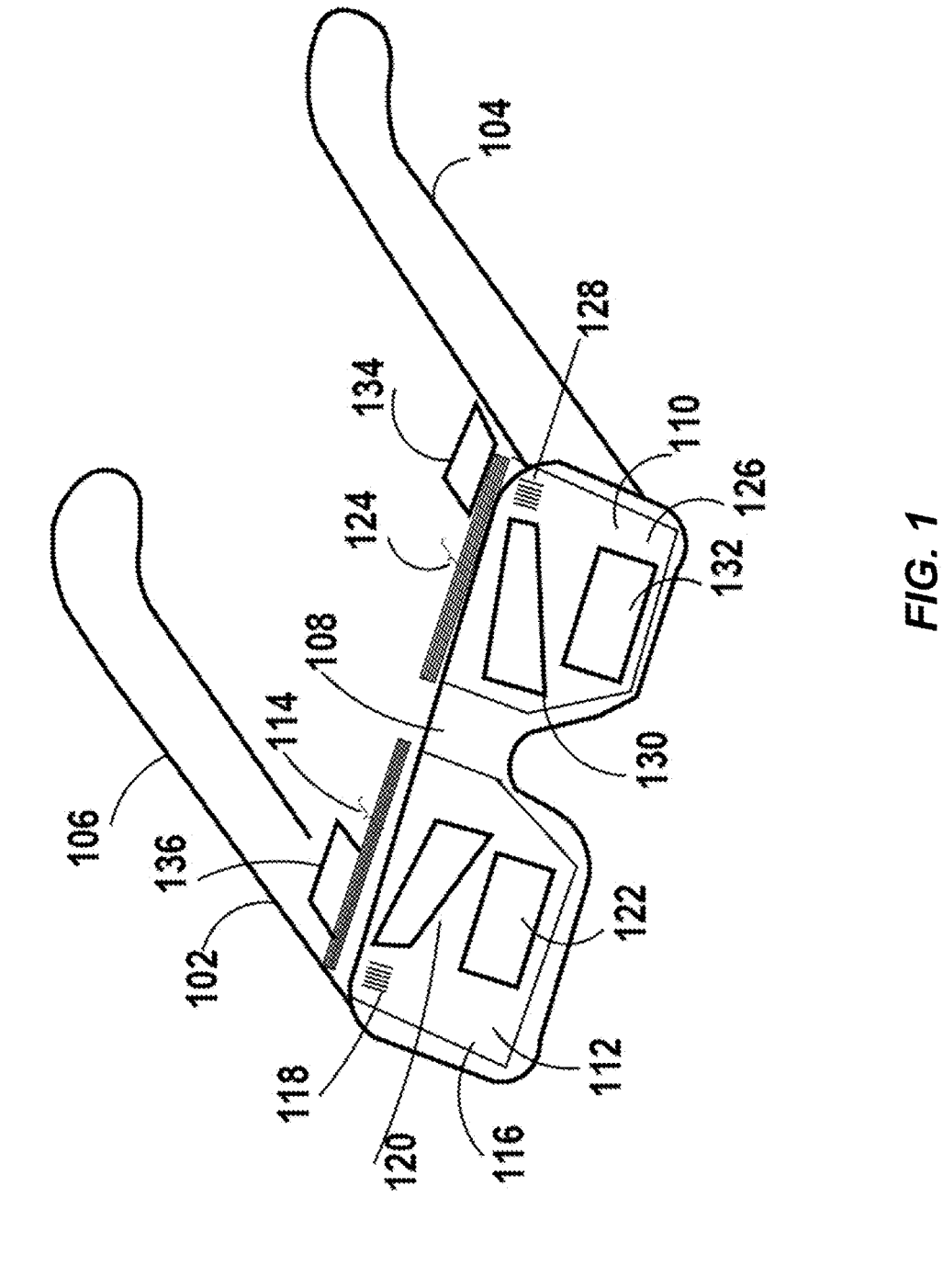
FIG. 1 is a schematic perspective view of a pair of augmented reality glasses according to an embodiment.

FIG. 1 is a perspective view of a pair of augmented reality glasses 100 according to an embodiment. The glasses 100 include a frame 102 including a left arm 104 and a right arm 106 connected by a front piece 108. The front piece 108 supports a left eyepiece 110 and a right eyepiece 112. Referring in particular to the right eyepiece 112 for the purpose of discussion, the right eyepiece 112 includes a right stack of a plurality of waveguides 114. The right stack of waveguides 114 is transparent so that a person wearing the glasses 100 can see the real world while wearing the augmented reality glasses 100 and virtual content can be superimposed and displayed in context with the real world. As is visible in FIG. 1 a right front waveguide 116 included in the right stack waveguides 114 includes a right front selectively actuable in-coupling grating 118, a right front orthogonal pupil expander 120, and a right front exit pupil expander 122. As taught in applicant's co-pending patent application Ser. No. 14/696,346 by Abovitz et al., entitled "Planar Waveguide Apparatus with Diffraction element(s) and System Employing Same" the exit pupil expander can be designed to impart different field curvature corresponding to different virtual source light to exiting light. Similarly, the left eyepiece 110 includes a left stack of waveguides 124 including a left front waveguide 126. As is visible in FIG. 1 the left front waveguide includes a left-front selectively actuable in-coupling grating 128, a left-side orthogonal pupil expander 130, and a left-side exit pupil expander 132. The left eyepiece 110 is also transparent. A left-side source of imagewise modulated light 134 and a right-side source of imagewise modulated light 136 are supported respectively inboard of the left arm 104 and the right arm 106 of the frame 102 and are selectively optically coupled, respectively to the left stack of waveguides 124 and the right stack of waveguides 114.

Figure 2:
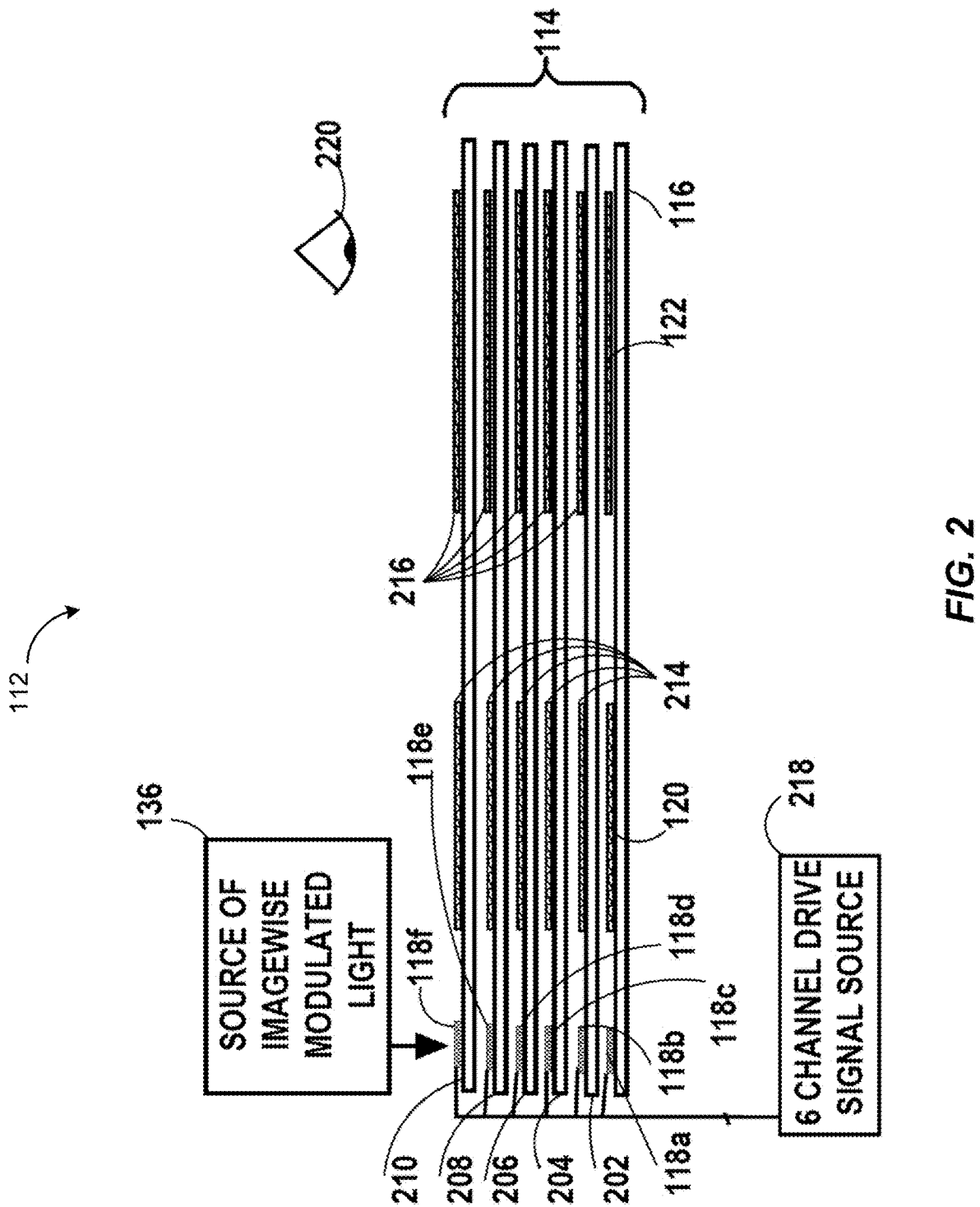
FIG. 2 is a schematic edge-on view of a portion of an eyepiece of the augmented reality glasses shown in FIG. 1, according to an embodiment.

FIG. 2 is a schematic edge-on view of the right eyepiece 112. Note that the placement of the in-coupling grating 118, the orthogonal pupil expander 120 and the exit pupil expander 122 is altered in FIG. 2 relative to the placement shown in FIG. 1 for the purpose of illustration. Although not shown the structure of the left eyepiece 110 is a mirror image of the structure of the right eyepiece 112. As shown in FIG. 2 in addition to the right front waveguide 116 the right stack of the plurality of waveguides 114 of the right eyepiece 112 includes a right second waveguide 202 disposed behind the right front waveguide 116, a right third waveguide 204 disposed behind the right second waveguide 202, a right fourth waveguide 206 disposed behind the right third waveguide 204, a right fifth waveguide 208 disposed behind the right fourth waveguide 206, a right back waveguide 210 disposed behind the right fifth waveguide 208. The second through fifth waveguides 202, 204, 206, 208 and back waveguide 210 have respectively a second through sixth selectively actuable incoupling grating 118*b*, 118*c*, 118*d*, 118*e*, 118*f*. The selectively actuable in-coupling gratings 118*a*, 118*b*, 118*c*, 118*d*, 118*e*, 118*f* can be designed, i.e., have a grating pitch and profile (e.g., blazed profile) to deflect imagewise modulated light that is incident perpendicularly to an angle above the critical angle for the waveguides 116, 202, 204, 206, 208. The second through fifth waveguides 202, 204, 206, 208 and back waveguide 210 also each include one of an additional set of orthogonal pupil expanders 214, and one of an additional set of exit pupil expanders 216.

A six channel drive signal source 218 is electrically coupled to the right-front and second through sixth selectively actuable incoupling gratings 118*a*, 118*b*, 118*c*, 118*d*, 118*e*, 118*f* and is used to switch the state of the selectively actuable incoupling gratings 118*a*, 118*b*, 118*c*, 118*d*, 118*e*, 118*f*. In operation one of the selectively actuable incoupling gratings 118*a*, 118*b*, 118*c*, 118*d*, 118*e*, 118*f* can be operated at a time in order to selectively route imagewise modulated light from the right-side source of imagewise modulated light 136 into one of the waveguide 116, 202, 204, 206, 208, 210 in the right stack of waveguides 114. The right-side source of imagewise modulate light 136 suitably outputs imagewise modulate light for different color channels and for different virtual object depths during separate time subframe periods. A particular sequence of color channels and depth planes can be repeated periodically at a video frame. The stack of six waveguides 114 can include two sets of three waveguides, wherein each of the two sets includes a red, a green and a blue color channel waveguide, and each of the two sets emits light with one of two virtual object distances which are determined by the field curvature of the emitted light. The six channel drive signal source 218 is suitably synchronized with the source of imagewise modulated light 132 such that when the imagewise modulated light for a particular color channel and an particular virtual object distance is being output by the source of imagewise modulated light 136 the six channel drive signal source 218 is operated to selectively turn on the selectively actuable incoupling grating of the waveguide that corresponds to particular color channel and the particular virtual object distance. Accordingly each selectively actuable incoupling grating would be turned on once for every video frame period. Light exiting from the front of the right eyepiece 110 is directed backward passing to an eye position 220.

Figure 3:
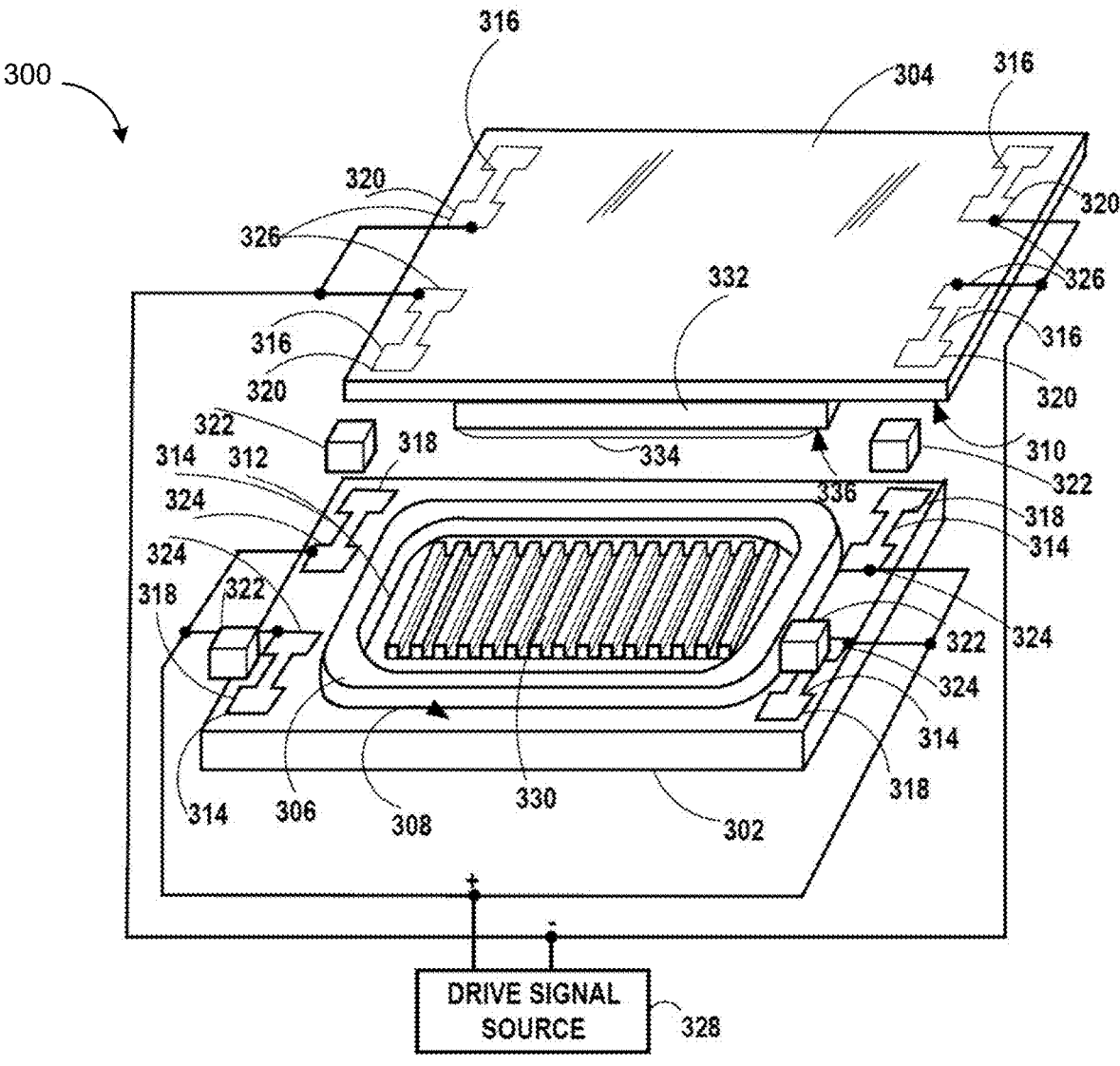
FIG. 3 is a schematic exploded view of a dynamically actuable diffractive optical element according to an embodiment.

FIG. 3 is an exploded view of a dynamically actuable diffractive optical element 300 according to an embodiment. The dynamically actuable diffractive optical element 300 shown in FIG. 3 can, for example, be used as one or more of the selectively actuable incoupling gratings 118a-118f of the augmented reality glasses. A different grating profile from what is shown for example a blazed grating profile may be used. Referring to FIG. 3 the optical element 300 includes a transparent bottom substrate 302 and a transparent top substrate 304. In the case that the dynamically actuable diffractive optical element is used as one of the selectively actuable incoupling gratings 118a-118f, the transparent bottom substrate 302 can take the form of one of the waveguides 116, 202, 204, 206, 208, 210. It should be understood that indication of relative positioning such as "top" and "bottom" correspond to the perspective shown in the figures and in real world uses the orientation of the devices depicted can vary relative to what is shown in the figures. A circumferential seal 306 is shown on a top surface 308 the transparent bottom substrate 302, and when the optical element 300 is assembled the circumferential seal 306 will also engage a bottom surface 310 of the transparent top substrate 304 forming a sealed space 312 between the transparent bottom substrate 302 and the transparent top substrate 304. The circumferential seal 306 is suitably formed of a flexible materials, such as for example a flexible polymeric materials. A set of four bottom metallization patterns 314 are located on the top surface 304 of the bottom substrate 302 and a corresponding set of four top metallization patterns 316 are located opposite the four bottom metallized patterns 314 on the bottom surface 310 of the top substrate. The four bottom metallization areas 314 each include bottom mounting pads 318 and the four top metallization areas 316 each include top mounting pads 320. Each of a set of four electromechanical transducers 322 is mechanically coupled to the bottom substrate 302 and the top substrate 304 via the bottom mounting pads 318 and the top mounting pads 320. The electromechanical transducers 322 can, for example, include: piezoelectric elements; blocks of thermally expandable, electroactive polymers, electrically heatable materials; deformable material that is deformed by electrostatic potential between opposite charges applied to the opposing mounting pads 318, 320; bimetallic elements equipped with heaters; a shape memory alloy bridging between opposing mounting pads 318, 320 so that a heating electrical current can be passed through; or transducers that utilize magnetic forces, such as Lorentz force based transducers, such as voice coil motors. Each of the four bottom metallization areas 314 also includes a bottom external circuit contact pad 324 and each of the four top metallization areas 316 also includes a top external circuit contact pad 326. A drive signal source 328 is coupled to the bottom external contact circuit pads 324 and the top external circuit contact pads 326. In the case that the dynamically actuable diffractive optical element 300 is used as one of the selectively actuable incoupling gratings 118a-118f, the drive signal source 328 can be included in the six channel drive signal source 218.

A transmissive surface relief diffraction grating 330 is positioned on the top surface 308 of bottom substrate 302 in the sealed volume 312 inside the circumferential seal 306. The transmissive surface relief diffraction grating 330 includes a set of channels 331. In the context of electromagnetic theory used to understand the operation of diffraction gratings, the material out of which the diffraction grating 330 is made is referred to as a first medium and the material or vacuum above the diffraction grating 330 is referred to as a second medium. The surface of the diffraction grating 330 forms a boundary between the first medium and the second medium. A transparent spacer block 332 is positioned on the bottom surface 310 of the top substrate 304. A film of fluid 334 is shown adhered to a bottom surface 336 of the spacer block 332. The fluid 334 can for example be or include water. The bottom surface 336 may be clean glass free of any organic contaminants. Clean glass is hydrophilic. The transmissive surface relief diffraction grating 330 can be made from a polymeric (e.g., organic, silicone-based) material. Polymeric materials are generally hydrophobic. The transmissive surface relief diffraction grating 330 can for example be microimprinted ultraviolet light cured polymer. Optionally, the transmissive surface relief diffraction grating 330 can be coated with a materials that is more hydrophobic than a material out of which the bulk of the transmissive surface relief diffraction grating 330 is made. Alternatively, the bottom surface 336 may be chemically treated to behave as hydrophilic, and the surface of the transmissive surface relief diffraction grating 330 may be chemically treated to behave as hydrophobic.

Assuming for example that the depth of the grooves 331 is about 200 nanometers and the length and width of the grating 330 have an order of magnate of a millimeter, the volume of the film of fluid 334 necessary to provide enough fluid to fill the grooves 331 will be an amount that has an order of magnitude of a one-tenth of picoliter. When the size of a body of fluid of a particular shape is scaled down the ratio of surface area to volume increases. Consequently the capillary forces increase compared to the inertia of the body of fluid meaning that the displacement of fluid attracted to a hydrophilic surface is accelerated. In the present case the smallness of the quantity of fluid 334 necessary to fill the grooves 331 leads to rapidity in the expulsion of the fluid 334 when the bottom surface 336 of the spacer block 332 is displaced upward.

The spacing between the bottom 336 of the transparent spacer block 330 and the top of the transmissive surface relief diffraction grating 330, when the electromechanical transducers 322 are in a first state, can be set to provide enough space for the fluid 334 to be coated on the bottom surface 336 of the transparent spacer block 332 without intruding into the grooves 331 of the diffraction grating 330. In the case that the fluid 334 is water, because the bottom surface 336 of the transparent spacer block 332 is hydrophilic and the surface of the diffraction grating 330 is hydrophobic, the water will naturally tend to go out of the grooves and adhere to the bottom surface 336 of the transparent spacer block 332. When the drive signal source 328 is operated to change the state of the electromechanical transducers 322 to a second state the distance between the bottom surface 336 of the transparent spacer block 332 and the diffraction grating 330 is reduced forcing the fluid 334 into the grooves 331. Aside from the fluid 334 the sealed volume 322 may be substantially devoid of other fluids or partially evacuated (i.e., include gas at less than atmospheric pressure) so as to reduce pressure resistance to reducing the spacing between the bottom substrate 302 and the top substrate under the action of the electromechanical transducers 322. Because the fluid 334 has an index of refraction that is closer to the index of refraction of the material used to form the transmissive surface relief diffraction grating 330 than does vacuum or any gas enclosed within the sealed volume 312 forcing the fluid 334 into the grooves 331 will substantially alter the operation of the diffraction grating 330. When the fluid 334 is forced into the grooves 331 light flux will shift from higher diffraction orders into the 0th order. For a transmission grating the 0th order corresponds to light continuing to propagate in the same direction at which the light was incident on the diffraction grating 330 (see equation 1 above). Referring again to FIG. 2, in the case that the dynamically actuable diffractive optical element 300 is used for each of the selectively actuable incoupling gratings 118a-118f, the ability to effectively selectively switch any of the gratings 330 off by switching energy to the 0th order, makes it possible to selectively couple imagewise modulated light from the source 136 into one of waveguides 116, 202, 204, 206,208, 210. Because the incoupling gratings 118a-118f are arranged overlying each other the image modulated 0th order light will traverse the waveguide stack 114 until reaching an incoupling grating in which the fluid 334 is displaced out of the grating grooves 331 and will then be diffracted into a higher order which is above the critical angle for TIR and thereby routed into one of the waveguides 116, 202, 204, 206, 208, 210.

Figure 4:
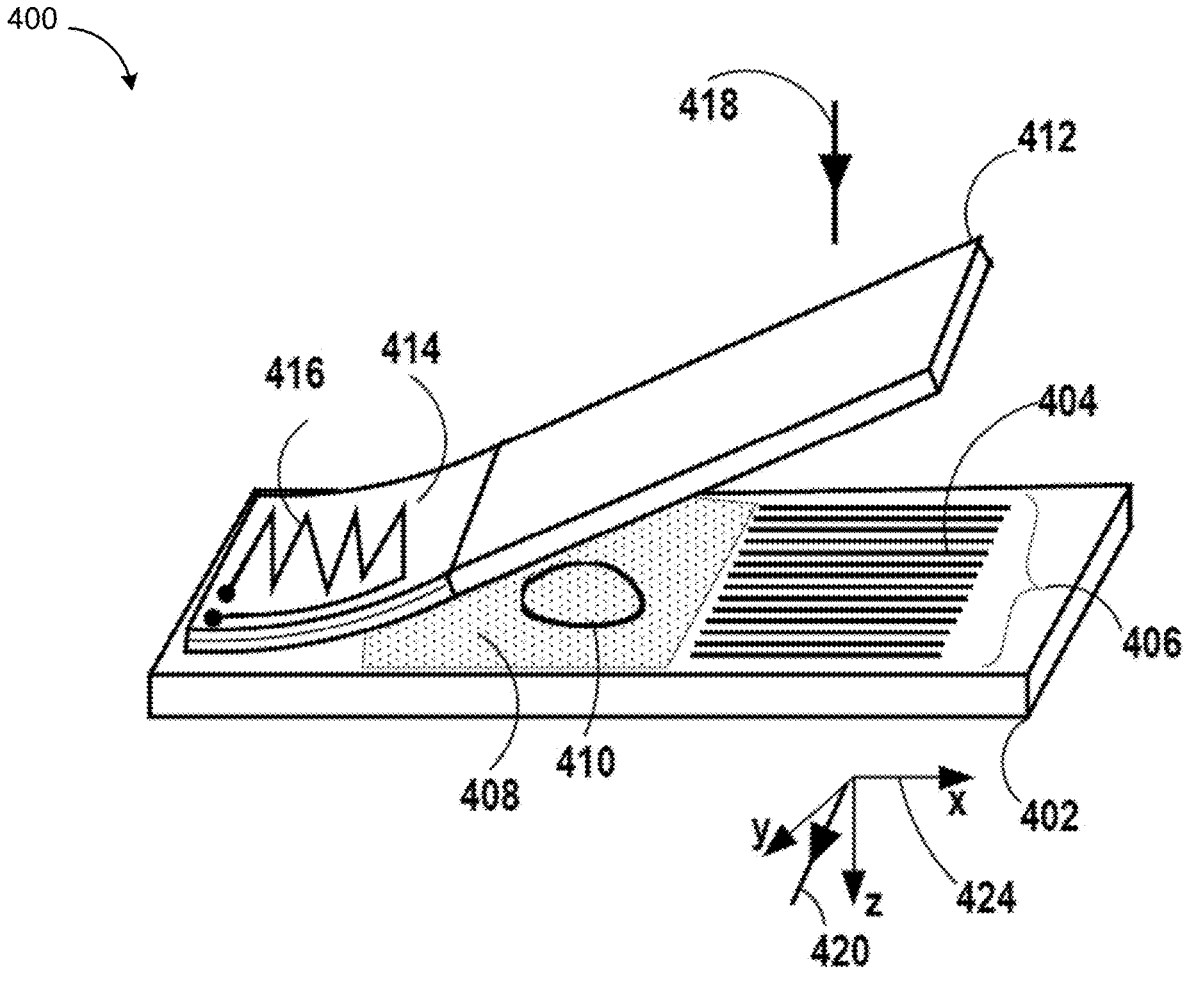
FIG. 4 depicts schematically a dynamically actuable diffractive optical device including a bimetallic element driven fluid displacement mechanism which is shown in an ON state according to an embodiment.
Figure 5:
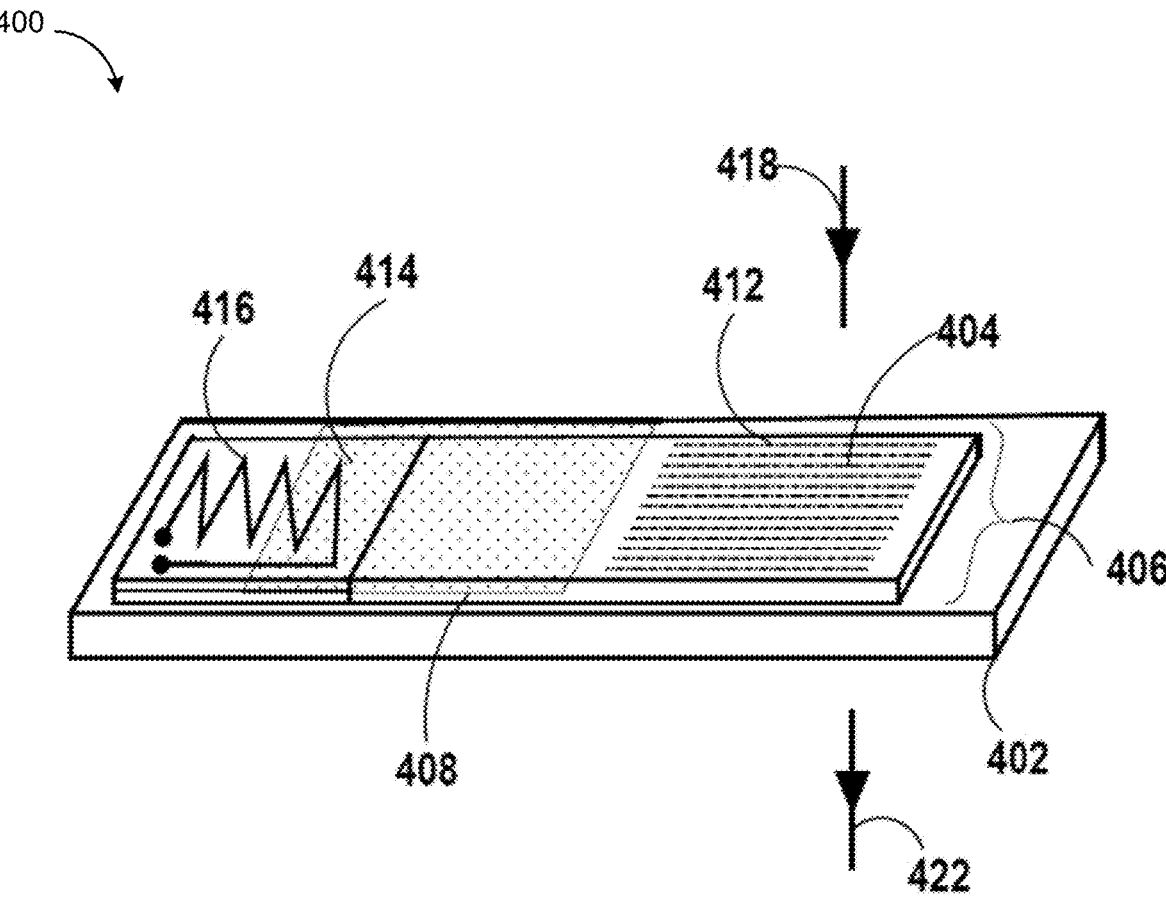
FIG. 5 shows the dynamically actuable diffractive optical device shown in FIG. 4 in an OFF state according to an embodiment.

FIG. 4 depicts a dynamically actuable diffractive optical device 400 including a bimetallic element driven fluid displacement mechanism which is shown in an ON state and FIG. 5 shows the optical device in the OFF state. Referring to FIG. 4 the optical device 400 includes a transparent base 402 on which surface relief transmissive diffraction grating 404 is supported. The transmissive diffraction grating 404 includes a parallel array of grooves 406 extending from left to right. Next to the grooves is a hydrophilic surface 408. The hydrophilic surface 408 may be the surface of the transparent base 402 or may be the surface of a coating on the transparent base 402. The transparent base 402 may include glass which is naturally hydrophilic. In FIG. 4 a quantity of fluid 410 is shown on the hydrophilic surface 408 to which it is drawn by hydrophilic attraction of the hydrophilic surface 408. An optical window 412 is supported by a bimetallic arm 414 above the hydrophilic surface. A heating element 416 is formed on the bimetallic arm 414. Typically the bimetallic arm 414 would be straight at room temperature and would be induced into curved state shown in FIG. 4 by heating caused by passing an electrical current through heating element 416. When the electric current is switched off the bimetallic arm 414 reverts to a straight, OFF state, configuration shown in FIG. 5 bringing the optical window 412 down to the transparent base 402 and displacing the quantity of fluid into the grooves 406 of the diffraction grating 404. A cofferdam (not shown) may be provided about the periphery of the optical window 412 and bimetallic arm 414 in order to contain the fluid 410. Displacing the fluid 410 into the grooves 406 will reduce or substantially eliminate diffraction of light into higher diffraction orders, such as for example a diffraction order that the grating is 404 is blazed to prefer. If the index of refraction of the fluid 410 is equal to the index of refraction of the transmission diffraction grating 404 then filling the grooves 408 with the fluid 410 will eliminate diffraction of light into higher diffraction orders (e.g., an order that the grating is blazed to prefer). If the index of refraction of the fluid 410 matches the index of refraction of the grating 404 and the fluid 410 is transparent then when the grooves 408 are filled with fluid 410 incident light will be propagated through in the zeroth order. Note that in FIG. 5 the grooves 406 are drawn with a reduce line weight to indicate partial effective disappearance of the grooves which would be the case if the index of refraction fluid 410 does not exactly match the index of refraction of the grating 404. The quantity of fluid 410 filling the grooves 406 is not distinctly visible in FIG. 5. If the fluid 410 is absorbing then a portion of the incident light will be absorbed. As shown in FIG. 4 when the optical device 400 is in the ON state an incident light ray 418 when passing through the grating 404 is deflected by diffraction to produce a diffracted ray 420. The diffracted ray is shown oriented relative to a Cartesian coordinate system triad 424. As shown in FIG. 5 when the optical device 400 is in the OFF state the incident light ray 418 passes through fluid 410 filled grating 404 continuing as a zeroth order transmitted ray 422.

Figure 6:
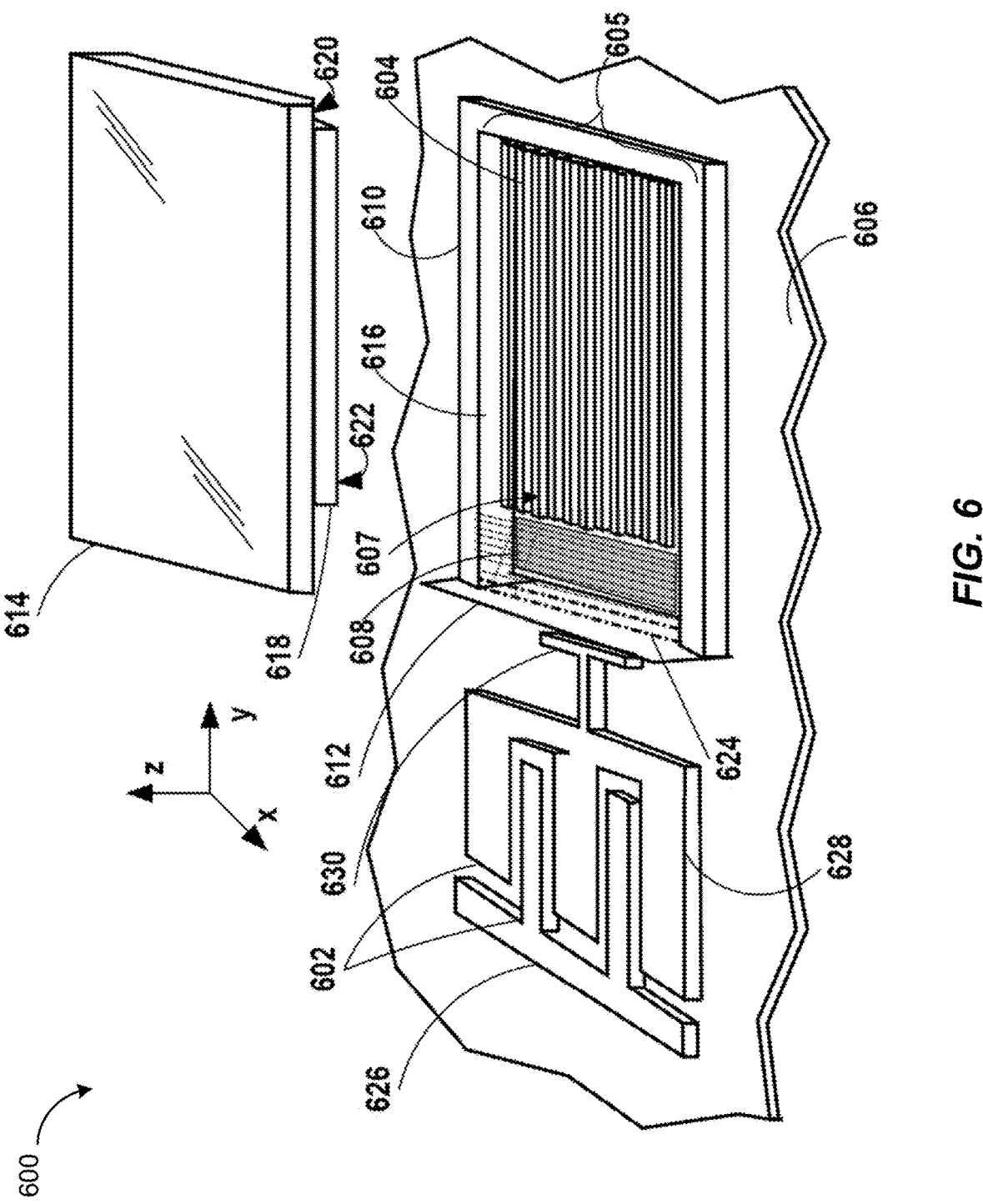
FIG. 6 is a schematic exploded view of a dynamically actuable diffractive optical device including an electrostatic MEMS comb drive according to an embodiment.

FIG. 6 is an exploded view of a dynamically actuable diffractive optical device 600 including an electrostatic MEMS comb drive 602 according to an embodiment. The device 600 includes a surface relief diffraction grating 604 supported on a transparent base 606. The surface relief diffraction grating 604 includes a parallel array of channels in the form of grooves 605 formed at a surface 607 of the grating. Whereas the grooves are located at the top surface 607 of the diffraction grating 606, alternatively the channels can be fully enclosed and run beneath the top surface 607 in which case the top surface may be flat, but could also have a second surface relief diffractive optic impressed therein. A hydrophilic surface 608 is located adjacent the diffraction grating 604 on the transparent base 606. A U-shaped peripheral dam 610 includes three sides partially surrounding the grating 604 and the hydrophilic surface 608. A remain side bridging open ends of the U-shape peripheral seal 610 is occupied by an elastic wall 612. An optical window 614 is attached to the U-shaped peripheral dam and the elastic wall 612 forming an enclosed volume 616. The height of the U-shaped peripheral dam 610 is greater than the height of the diffraction grating 604. A transparent spacer block 618 is attached to a bottom surface 620 of the optical window 614 facing the diffraction grating 604. There may be a small gap or no gap between the diffraction grating 604 and a bottom surface 622 of the spacer block 618. A quantity of fluid 624 is shown located adjacent the diffraction grating 604 overlying the hydrophilic surface 608. A cross sectional area (area in X-Z plane) in region of the grooves 605 diffraction grating 604 is smaller than a cross sectional area above the hydrophilic surface 608.

The comb drive 602 includes a first comb 626 interdigitated with a second comb 628. Electric potentials can be applied to the first comb 626 and the second comb 628 (e.g., by the 6 channel drive signal source 218) in order to establish electrostatic forces between the first comb 626 and the second comb 628. The first comb 626 may be substantially rigidly fixed to the transparent base 606 and the second comb 628 may be moveably, mechanically, coupled to the transparent base 606, e.g., through an integrally formed flexure (not shown). A pusher 630 is integrally formed with the second comb drive 616. The pusher bears 630 against and may be attached to elastic wall 612. In operation voltages are applied to the combs 626, 628 in order induce the pusher 630 to exert a pulling or pushing force on the elastic wall 616 in order to allow the fluid 624 to occupy the space over overlying the hydrophilic surface 608 or to force at least a portion of the fluid 624 into grooves 605 of the grating 604. Because of the difference in the cross sectional (X-Z plane) areas over the grating 604 compared to the cross sectional area over the hydrophilic surface 608, if the region over the hydrophilic surface 608 is, in a grating ON state, substantially filled with the quantity of fluid 624 and the quantity of fluid 624 is substantially confined to the region over the hydrophilic surface 608, a small displacement of the elastic wall 612 will cause at least a portion of the quantity of fluid 624 to traverse the length of the grating 604 filling the grooves 605 of the grating 604.

Figure 7:
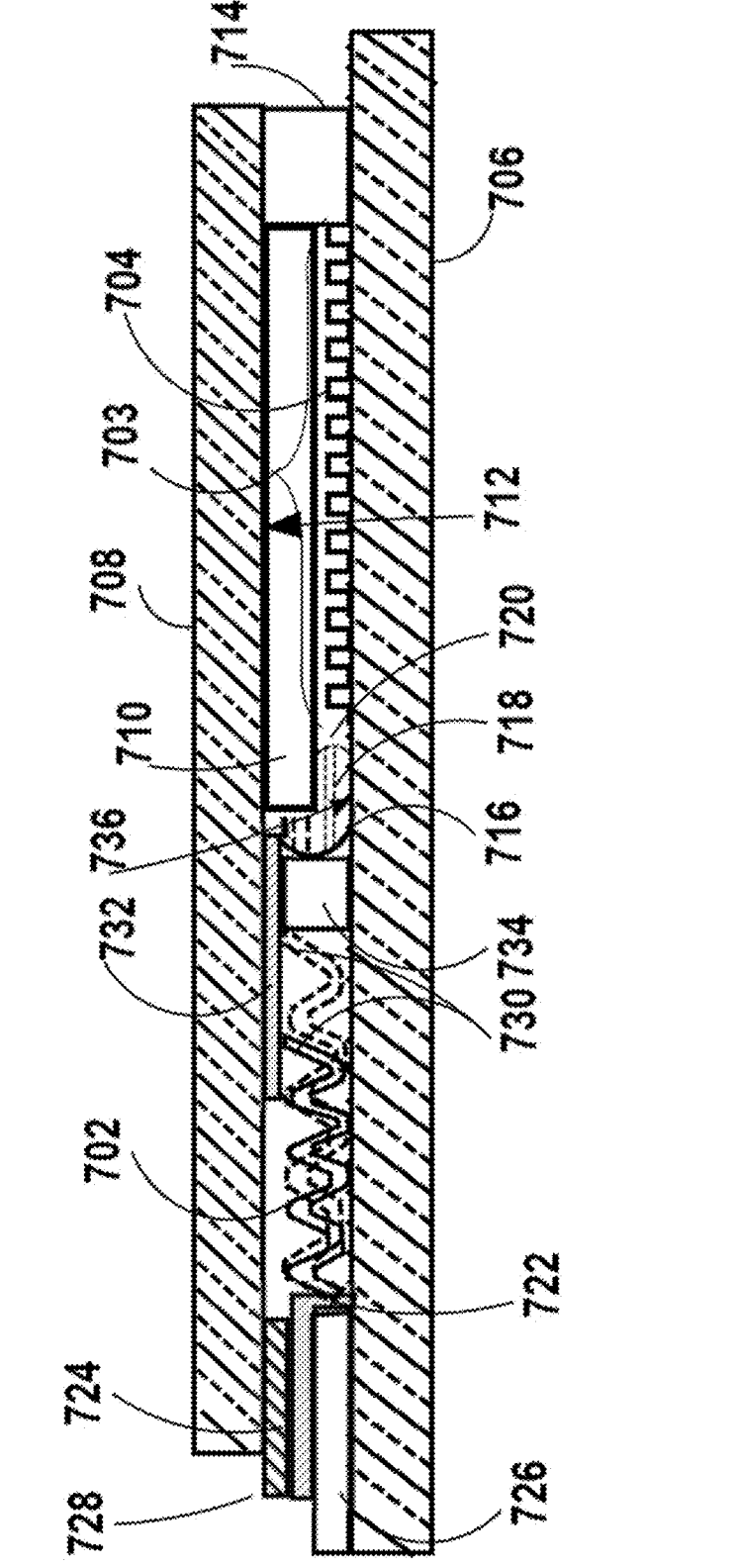
FIG. 7 is a schematic cross-sectional elevation view of a dynamically actuable diffractive optical device including a shape memory alloy based actuator according to an embodiment.

FIG. 7 is a cross-sectional elevation view of a dynamically actuable diffractive optical device 700 including a shape memory alloy 702 based actuator according to an embodiment. The device 700 includes a surface relief diffraction grating 704 supported on a transparent base 706. The diffraction grating 704 includes a series of grooves 703 (a limited number of which are enumerated to avoid crowding the figure). A transparent cover 708 is positioned overlying the surface relief diffraction grating 704. A transparent spacer 710 is attached to an inside surface 712 of the transparent cover 708 facing the surface relief diffraction grating 704. An edge seal 714 seals between the transparent base 706 and the transparent cover 708 and is visible at the right side of the device 700 as depicted in FIG. 7. A flexible diaphragm 716 is located to the left of the grating 704. A quantity of fluid 718 is disposed in a space 720 bounded by the edge seal 714, transparent spacer 710, grating 704, transparent base 706 and diaphragm 716. The shape memory alloy 702 is in the form of a helix and is connected at a first end 722 to a first electrode 724 that extends between a spacer block 726 and a secondary seal 728. A second end 730 of the shape memory alloy 702 slidingly contacts a second electrode 732 that is formed on the transparent cover on an opposite side of the diaphragm 716 from the grating 704. The first electrode 724 and the second electrode 732 are connected to an electrical power source (not shown). The second end 730 of the shape memory alloy 702 also bears against a sliding piston 734 that in turn bears against the diaphragm 716. Alternatively the piston 734 could be integrally formed with the shape memory alloy 702. When electrical power is applied through the first electrode 720 and the second electrode 730 to the shape memory alloy 702, the shape memory alloy 702 elongates (involving a lengthening of a helical pitch of the helix shape of the shape memory alloy 702), pushing the sliding piston 734 that in turn pushes the diaphragm 716 which displaces the fluid 718 into the grooves 703 of the grating. Although as shown in FIG. 7 the grooves 703 run perpendicular to the plane of the drawing sheet, alternatively the grooves 703 may run parallel to the plane of the drawing sheet or in another direction. The diffraction grating 704 is suitably made of a hydrophobic material and an exposed top surface 736 of the transparent base 706 is suitably hydrophilic so that in the absence of the displacement action induced by power applied to the shape memory alloy the fluid 718 is drawn to the exposed top surface 736 and out of the grooves 703 of the diffraction grating. The fluid 718 has an index of refraction which is closer to an index of refraction of the diffraction grating than is a residual gas in the space 720 so that when the fluid 718 is in the grooves 703 the diffraction efficiency of the grating 704 is substantially diminished. Thus the dynamically actuable diffraction grating 700 can be effectively switched on or off by selectively displacing the fluid 718 into and out of the grooves 703.

Figure 8:
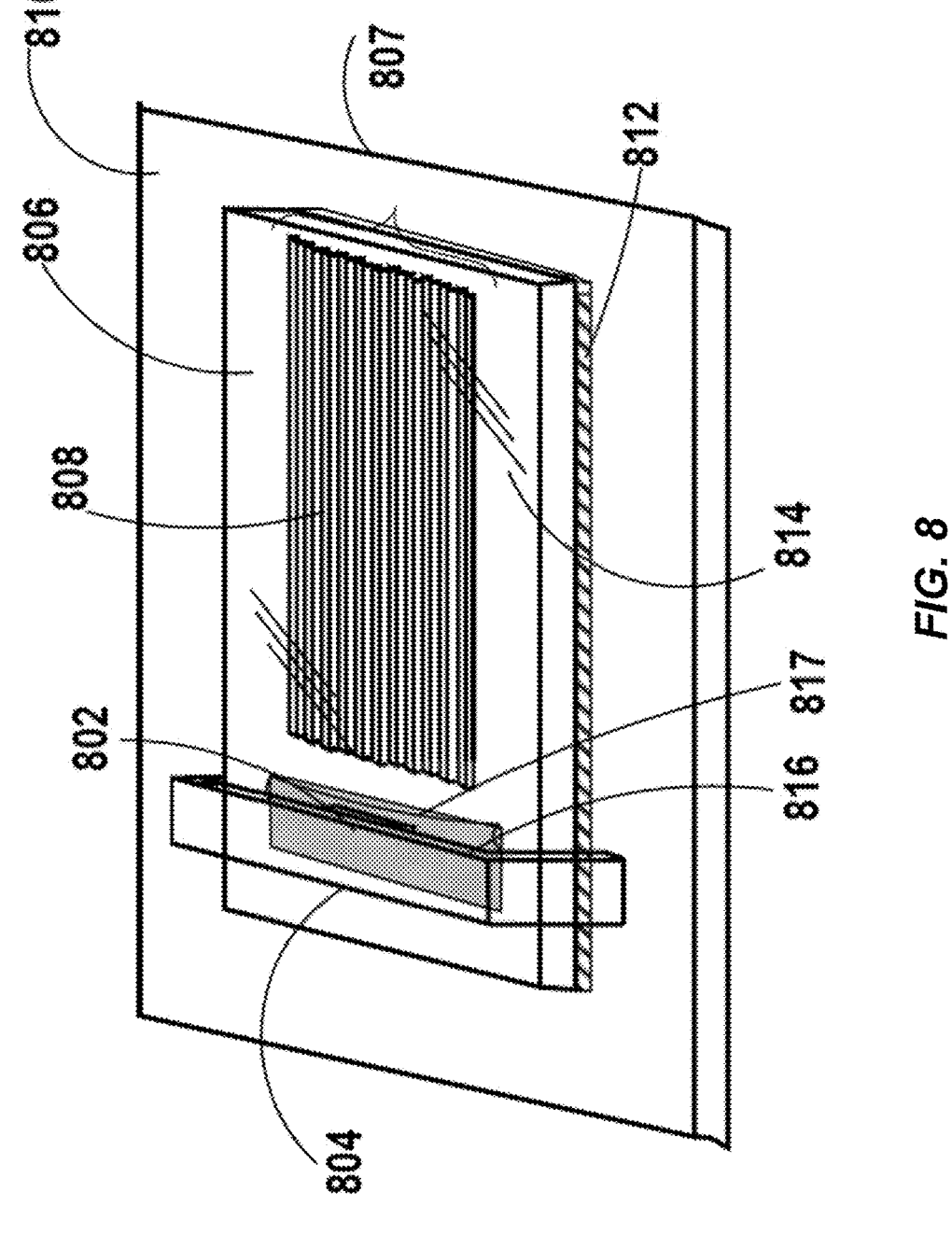
FIG. 8 is a schematic perspective view of a dynamically actuable diffractive optical device that includes an actuator located between a truss and an optical window according to an embodiment.

FIG. 8 is a perspective view of a dynamically actuable diffractive optical device 800 that includes an actuator 802 located between a truss 804 and an optical window 806. The device 800 includes a surface relief transmissive diffraction grating 808 supported on a transparent substrate 810. The diffraction grating 808 includes a series of grooves 807. The optical window 806 is supported on the transparent substrate 810 by an edge seal 812 forming an internal space 814 in which the grating 808 is located. The truss 804 is bonded to the transparent substrate 810 on two sides of the optical window 806 and the actuator is positioned between the truss 804 and the optical window 806. A hydrophilic surface 816 (e.g., bare surface of the transparent substrate 810) is positioned in the internal space 818 adjacent to the grating 808. A quantity of fluid 817 is provided in the internal space 818, and owing to the hydrophilic character of the surface 816 and the hydrophobic character of the grating 808 tends naturally to collect on the hydrophilic surface 816. The actuator 802 can take the form of an electromechanical transducer such as, by way of nonlimitive example, a piezoelectric element, a voice coil motor, or an electrically heatable, thermally expanding body of material. The truss 804 and actuator 802 are positioned over the hydrophilic surface 814. Actuation of the actuator 802 exerts a downward force on the optical window 806 causing the optical window 806 to flex downward and/or the edge seal 812 to compress in the vicinity of the hydrophilic surface 816 thereby displacing the quantity of fluid 817 (or a portion thereof) into the grooves 807 of the grating 808. Thus the dynamically actuable diffraction optical device 800 can be effectively switched on or off by selectively displacing the quantity of fluid 817 into and out of the grooves 807.

Figure 9:
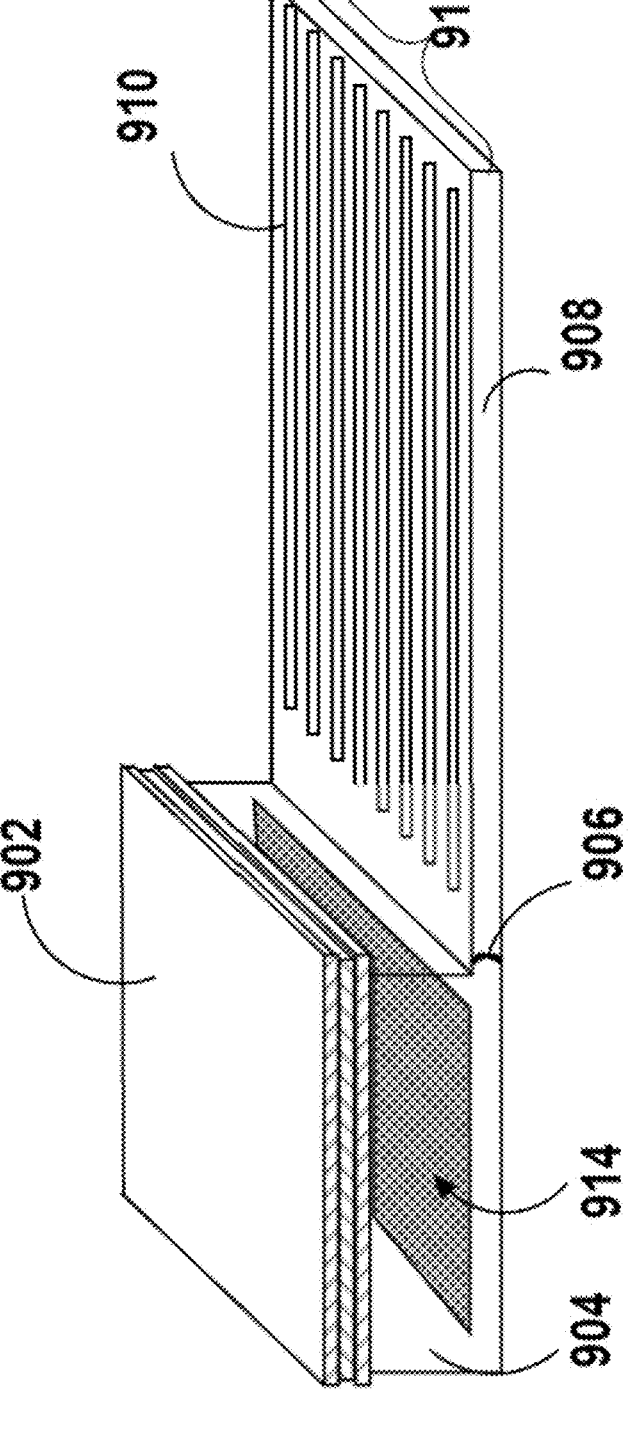
FIG. 9 is a schematic perspective view of a dynamically actuable diffractive optical device that utilizes thermal expansion of a fluid to drive actuation according to an embodiment.

FIG. 9 is a perspective view of a dynamically actuable diffractive optical device 900 that utilizes thermal expansion of a fluid to drive actuation. The device 900 includes a heater element 902 in contact with a fluid reservoir 904 that holds a fluid 906. The reservoir 904 is in fluid communication with grating chamber 908 that houses a surface relief diffraction grating 910. The surface relief diffraction grating 910 includes a series of grooves 912. The fluid reservoir 904 includes a hydrophilic surface 914. In operation the heater element 902 is activated which causes the fluid 906 to expand into the grating chamber 908 filling the grooves 912 of the diffraction grating 910 and substantially reducing the efficiency of the diffraction grating 910, effectively turning the diffraction grating 910 off. Subsequently the heater element 902 can be turned off and the fluid allow to cool and contract back into the fluid reservoir 904.

Figure 10:
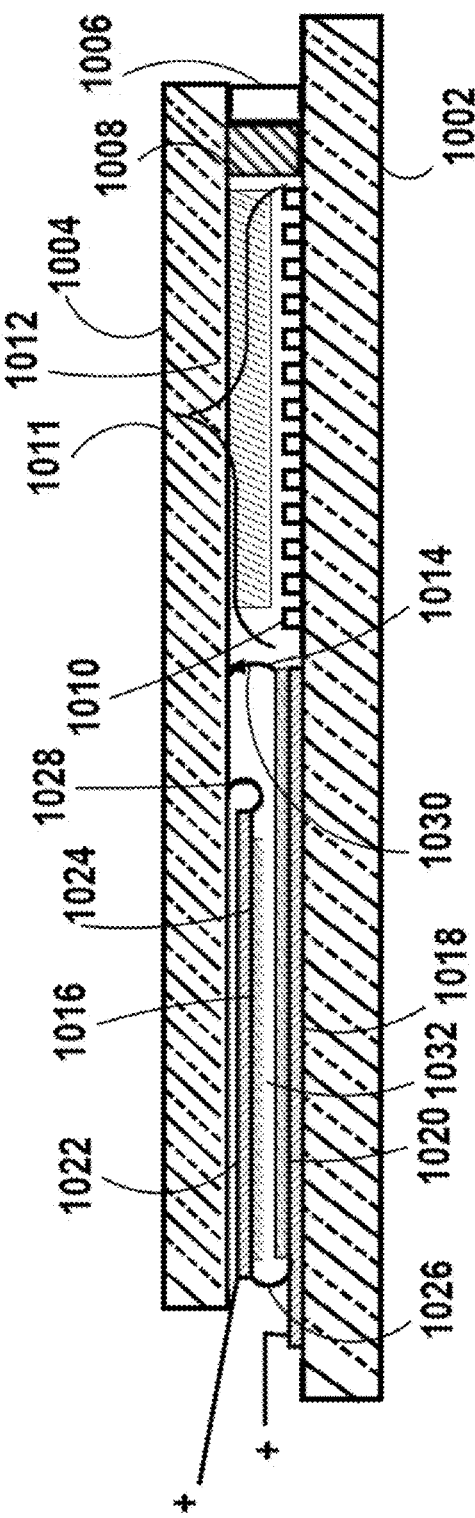
FIG. 10 is a schematic cross-sectional view of a dynamically actuable diffractive optical device including an electrostatic fluid displacer, shown in an ON state, according to an embodiment.
Figure 11:
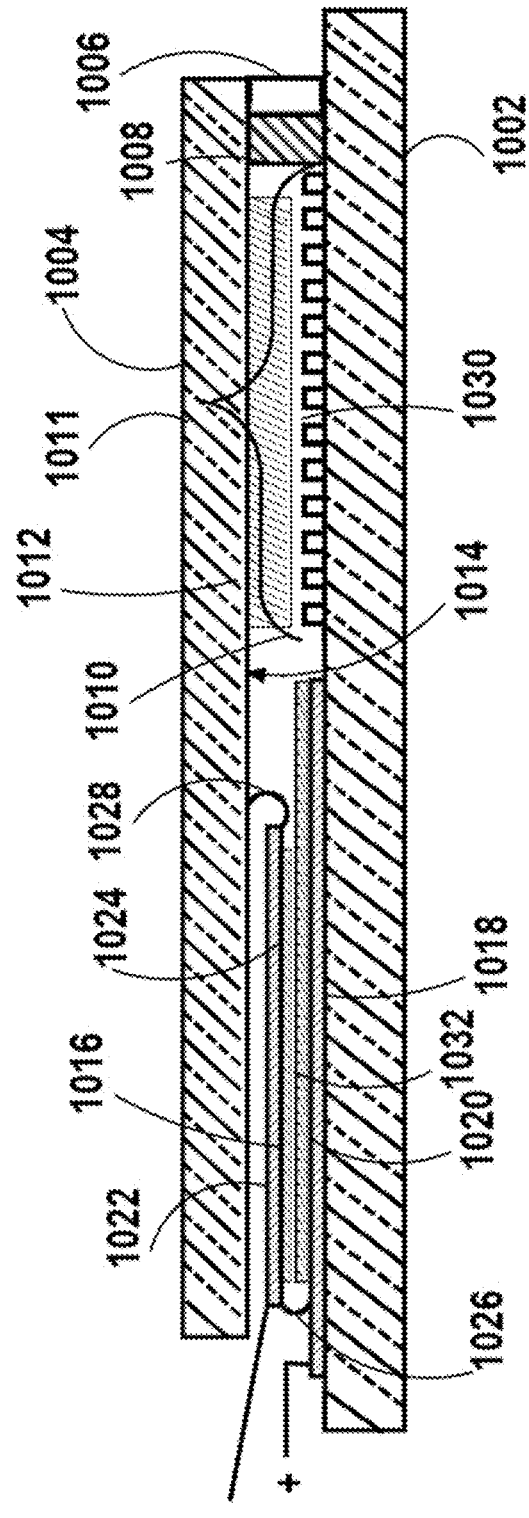
FIG. 11 is a cross-sectional view of the dynamically actuable diffractive optical device shown in FIG. 10, shown in an OFF state, according to an embodiment.

FIG. 10 is a cross-sectional view of a dynamically actuable diffractive optical device 1000 including an electrostatic fluid displacer 1016, shown in an ON state and FIG. 11 is a cross-sectional view of the dynamically actuable diffractive optical device 1000 in an OFF state. Referring to FIGS. 10-11, the device 1000 includes a transparent base 1002 and a transparent window 1004 supported above the transparent base 1002 by an edge spacer 1006 and an edge seal 1008. A transmissive surface relief diffraction grating 1010 is supported on the transparent base 1002. The surface relief diffraction grating 1010 includes a series of grooves 1011. A transparent spacer block 1012 is affixed to an inside surface 1014 of the transparent window 1004 above the diffraction grating 1010. The purpose of the transparent block 1012 is to reduce the volume of the region above the diffraction grating 1010, such that displacement of a relatively small amount of a fluid 1030 can fill the region. The electrostatic fluid displacer 1016 is located adjacent to the diffraction grating 1010 and includes: a fixed electrode 1018 supported on the transparent base 1002; a first hydrophilic layer 1020 (e.g., glass) born on the fixed electrode 1018; a moving electrode 1022 positioned above the fixed electrode 1018 and first hydrophilic layer 1020, a second hydrophilic layer 1024 (e.g., glass) on the moving electrode 1022 facing the first hydrophilic layer 1020; a first flexible seal 1026 sealing between the moving electrode 1022 and the fixed electrode 1018; and a second flexible seal 1028 sealing between the moving electrode 1022 and the window 1004. Although the grooves 1011 are depicted as being aligned perpendicular to the plane of the drawing sheet, in practice the grooves 1011 may be aligned parallel to the plane of the paper and extend all the way to the first hydrophilic layer 1024. The fluid 1030 which has an index of refraction that matches the index of refraction of the diffraction grating 1010 or is closer to the index of refraction of the diffraction grating than air is disposed in the device 1000. According to one possible mode of operation a fixed voltage is applied to the fixed electrode 1018 and a voltage of either positive or negative polarity is applied to the moving electrode 1022. The roles of the electrodes 1018, 1022 can be reversed in so far as the application of the voltages described. When the polarity of the voltages applied to both electrodes 1018, 1022 are the same (ON state) the moving electrode 1022 will be repelled from the fixed electrode 1018 opening up a gap 1032 between the first hydrophilic layer 1020 and the second hydrophilic layer 1024 allowing at least a portion of the fluid 1030, per its natural affinity to be drawn to the hydrophilic layers 1020, 1024 to be drawn into the gap. On the other hand when the polarity of the voltages applied to the two electrodes 1018, 1022 are opposite (OFF state) the electrodes 1018, 1022 are drawn toward each other thereby expelling the quantity of fluid 1030 from between the hydrophilic layers 1020, 1024 and forcing the fluid 1030 into the groves 1011 of the diffraction grating 1010. As shown in FIG. 10 with the device 1000 in the ON state, the electrodes 1018, 1022 are spaced relatively further apart, the fluid 1030 is drawn by the hydrophilic layers 1020, 1024 is largely confined to the region overlying the first hydrophilic layer 1020 and the diffraction grating 910 is functioning at its maximum efficiency. On the other hand as shown in FIG. 11 with the device 1000 in the OFF state, the electrodes 1018, 1022 are spaced relatively closer together, the fluid 1030 has been substantially expelled from the region between the hydrophilic layers 1020, 1024 into grooves 1011 of the diffraction grating 1010 and the diffraction efficiency of the grating 1010 is substantially reduced.

Figure 12:
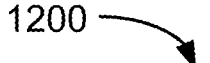
FIG. 12 is a schematic top view of a metamaterial diffractive optical element according to an embodiment.
Figure 12:
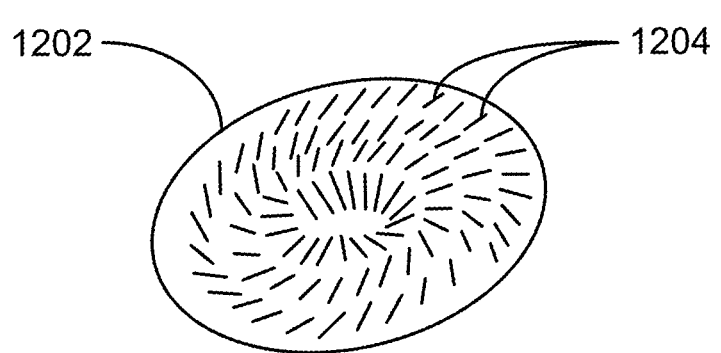

FIG. 12 is a top view of a metamaterial diffractive optical element 1200. The metamaterial diffractive optical element 1200 functions as a lens. The optical element 1200 includes a surface relief structure 1202 including a plurality of raised portions 1204 (a limited number of which are labeled to avoid crowding the figure). In certain embodiments the raised portions 1204 have a maximum transverse dimension of less than 100 nanometers and substantially less than the wavelength of a light source (not shown) which is optically coupled to the metamaterial diffractive optical element 1200. The light source that is optically coupled to the metamaterial diffractive optical element 1200 can for example be a laser diode (LD) or a light emitting diode (LED).

Figure 13:
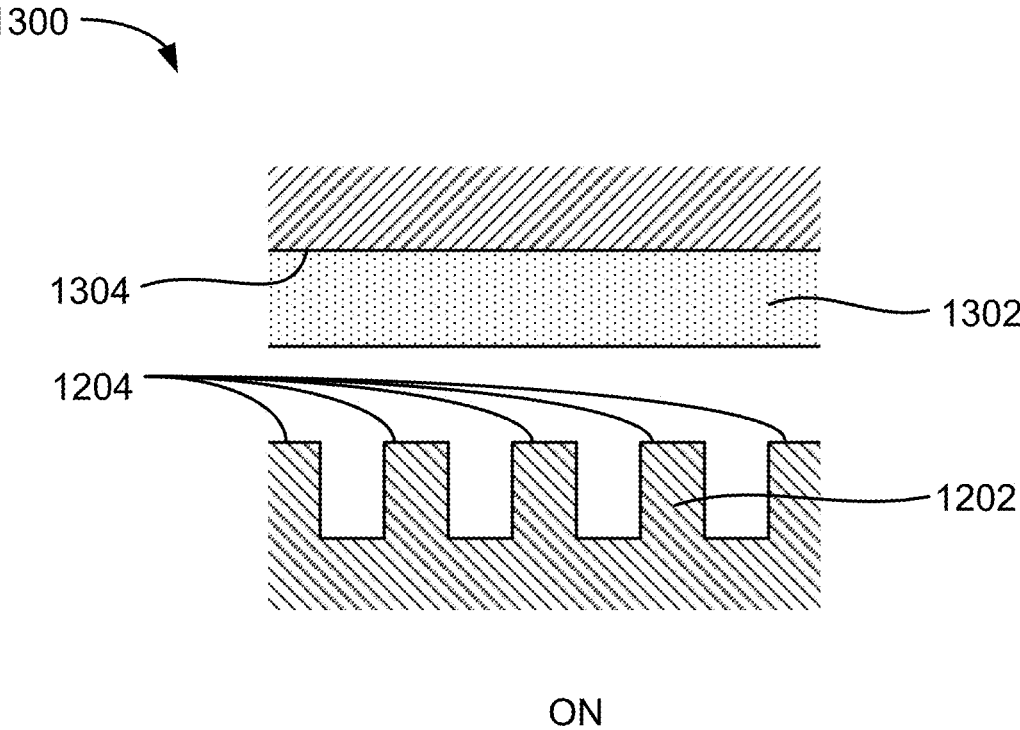
FIG. 13 is a schematic cross sectional elevation view of a dynamically actuable lens that includes the metamaterial diffractive optical element shown in FIG. 12, shown in an ON state, according to an embodiment.
Figure 14:
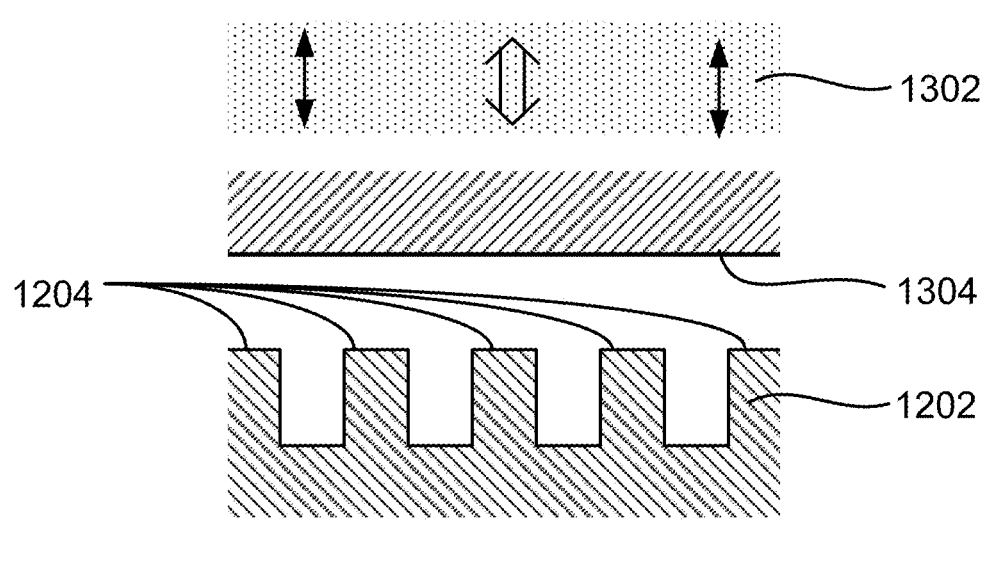
FIG. 14 is a schematic cross section elevation view of the dynamically actuable lens shown in FIG. 13, but shown in an OFF state, according to an embodiment.

FIG. 13 is a schematic cross sectional elevation view of a dynamically actuable lens 1300 that includes the metamaterial diffractive optical element 1200 shown in FIG. 12. In FIG. 13 the dynamically actuable lens 1300 is shown in an ON state. As shown in FIG. 13, a fluid 1302 is adhered to a moveable surface 1304 which serves to displace the fluid 1302. The fluid 1302 and the surface 1304 can be chosen to have a natural affinity to each other. FIG. 14 is a cross section elevation view of the dynamically actuable lens 1300 shown in FIG. 13, but shown in an OFF state. As shown in FIG. 14 the surface 1304 has been moved downward relative to the position shown in FIG. 13 thereby displacing the fluid 1302 into the surface relief structure 1202. The fluid 1302 is chosen to have close match to the index of refraction of the surface relief structure 1202 so as to effectively reduce the effect of the surface relief structure 1202 on light waves with which the surface relief structure 1202 interacts.

Although various diffractive grating embodiments are described above, other diffractive optical elements that include a profiled boundary between two mediums (e.g., between optical grade polymer and air) which diffracts light and which can be covered in fluid thereby altering the diffractive functioning can also be provided. Examples would include replacing the diffraction gratings in the above described embodiments, with positive or negative surface relief pattern diffractive lenses.

According to an alternative embodiment a dynamically actuable reflective surface relief diffraction grating that includes a fluid for displacing into and out grooves of the reflective diffraction grating and a fluid displacer for displacing the fluid into and out of the grooves.

According to some embodiments of the present invention, nanofluidics may be applied to diffraction optics (which may be referred to as nano-opto-fluidics). Switchable or tunable diffractive gratings may be formed by using fluid within nanometer scale structures. These nano-opto-fluidics devices can potentially employ multiple immiscible fluids (e.g., an index matching fluid along with a fluid with significantly different refractive index) that operate within a nanofluidic circuit actuated by nanofluidic actuation techniques in order to switch between optical states.

Nanofluidics is the study of fluids confined within nanoscale structures (e.g., 1 to 100 nm). The physics of fluids at nanoscale makes the fluids' behaviors markedly different from those in macroscale structures (e.g., turbines) or even microscale structures (e.g., inkjet print heads). For example the electroosmotic phenomena is much more pronounced at nanoscale.

Electroosmotic flow (also referred to as electroosmosis) is the motion of fluid induced by an applied potential across a porous material, such as a capillary tube, a membrane, a microchannel, or any other fluid conduit. Electroosmosis is caused by the Coulomb force induced by an electric field on net mobile electric charge in a polar fluid, such as water or electrolytic solution. Because the chemical equilibrium between a solid surface and an electrolytic solution typically leads to the interface acquiring a net fixed electrical charge, a layer of mobile ions, known as an electrical double layer or Debye layer, forms in the region near the interface. When an electric field is applied to the fluid (usually via electrodes placed at inlets and outlets), the net charge in the electrical double layer is induced to move by the resulting Coulomb force. The characteristics of the flow depends on chemical interaction between the solid surface and the fluid, the characteristic length scale of the channel, and the applied electric field.

Figure 15:
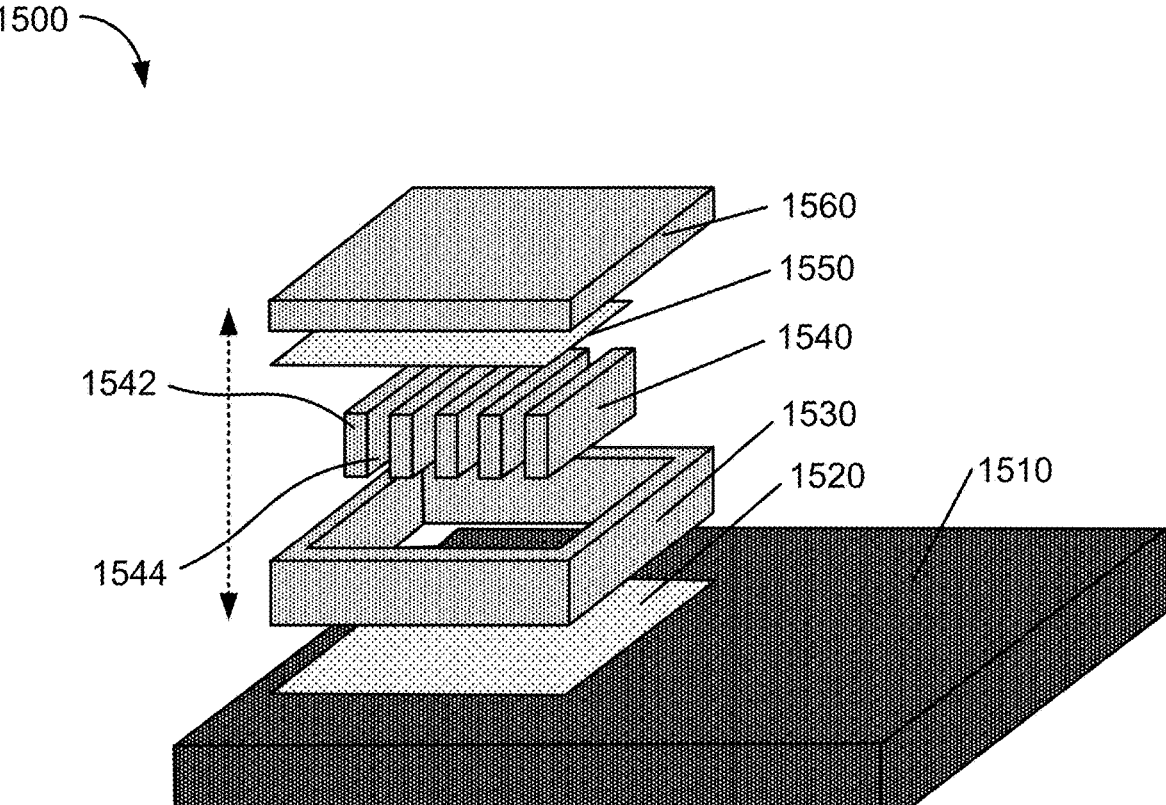
FIG. 15 shows schematically an exploded view of a dynamically actuable diffractive grating operable via the electroosmosis effect according to some embodiments.
Figure 16:
FIG. 16 shows an assembled view of the dynamically actuable diffractive grating shown in FIG. 15 according to some embodiments.
Figure 16:
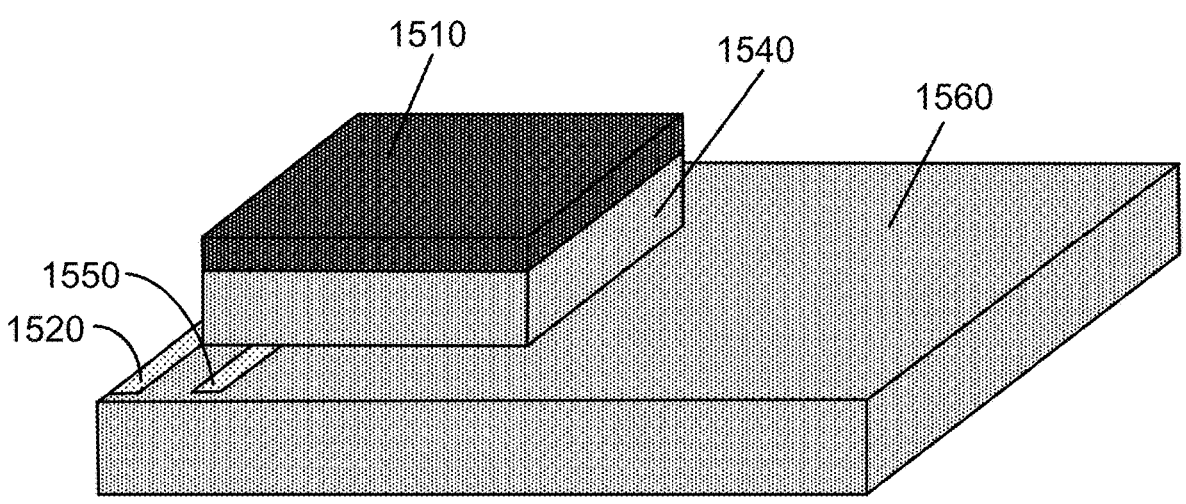

FIG. 15 shows schematically an exploded view of a dynamically actuable diffractive grating 1500 operable based on the electroosmosis effect according to some embodiments of the present invention. FIG. 16 shows an assembled view of the dynamically actuable diffractive grating 1500. The diffractive grating 1500 may be fabricated on an optical waveguide 1510, and may function as an incoupling grating for the optical waveguide 1510. The waveguide 1510 may comprise, for example, sapphire or other dielectric materials. The diffractive grating 1500 may include a first transparent electrode 1520 coupled to a surface of the waveguide 1510. The first transparent electrode 1520 may comprise, for example, indium tin oxide (ITO), graphene, or other transparent conductive materials.

The diffractive grating 1500 further includes a chamber 1530 formed on the surface of the waveguide 1510. The chamber 1530 may comprise silicon dioxide or other suitable materials. The diffractive grating 1500 further includes a nanoscale diffraction grating structure 1540 formed on the first transparent electrode 1520 and within the chamber 1530. The diffraction grating structure 1540 may comprise, for example, silicon dioxide or other dielectric materials. The diffraction grating structure 1540 may include a plurality of ridges 1542 with a plurality of channels 1544 between adjacent ridges 1542. A fluid with an index of refraction that substantially matches with the index of refraction of the diffraction grating structure 1540 may be pumped into or out of the channels 1544 via electroosmosis, thereby dynamically activating or deactivating the diffractive grating 1500. The chamber 1530 houses both the diffraction grating structure 1540 and the fluid.

The diffractive grating 1500 further includes a second transparent electrode 1550 coupled to the top of the diffraction grating structure 1540. The second transparent electrode 1550 may comprise indium tin oxide (ITO), graphene, or other transparent conductive materials. The first transparent electrode 1520 and the second transparent electrode 1550 may enable an electric potential applied thereto for activating or deactivating the diffractive grating 1500, while allowing light to pass through unaffected. The diffractive grating 1500 may further include a cover 1560. The cover 1560 may comprise silicon dioxide or other dielectric materials. The cover 1560 may seal the chamber 1530 to retain the fluid.

Figure 17A:
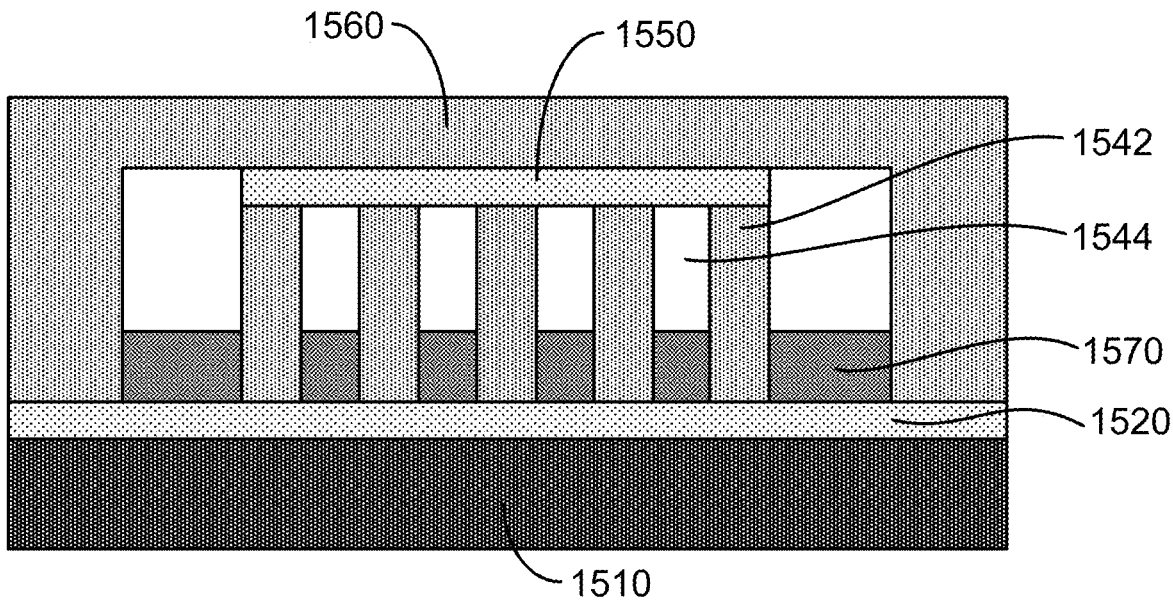
FIGS. 17A and 17B illustrate the principle of operation of the dynamically actuable diffractive grating shown in FIGS. 15 and 16 according to some embodiments.
Figure 17B:
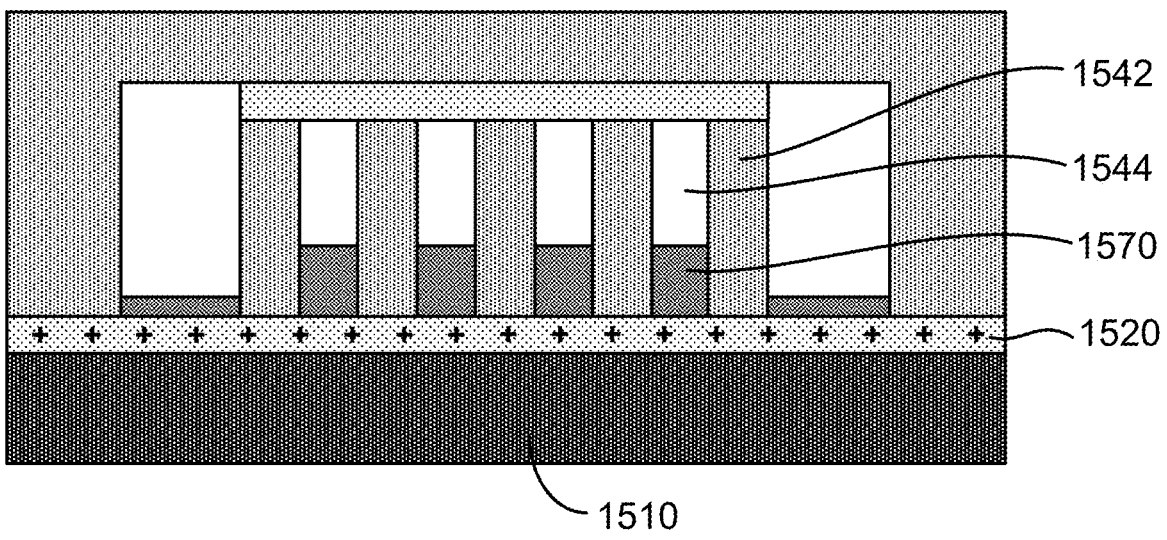

FIGS. 17A and 17B illustrate the principle of operation of the diffractive grating 1500 shown in FIGS. 15 and 16 according to some embodiments of the present invention. In an "on" state, as illustrated in FIG. 17A, the fluid 1570 may be evenly distributed with a height of about 100 nm at the bottom of the plurality of channels 1544. In an "off" state, as illustrated in FIG. 17B, the fluid 1570 is drawn upward to a height of about 200 nm, substantially filling the plurality of channels 1544. The fluid 1570 may be drawn upward via electroosmosis by applying a voltage between the second transparent electrode 1550 and the first transparent electrode 1520. The diffraction grating structure 1540 and the fluid 1570 have matching indices of refraction such that the diffraction grating structure 1540 is optically invisible when immersed in the fluid 1570. Reversing or relaxing the electroosmosis voltage may drain the fluid 1570 from the diffraction grating structure 1540, thereby returning the diffractive grating 1500 to the "on" state.

In some embodiments, the fluid 1570 may have an index of refraction of about 1.33. The fluid 1570 may be a polar fluid, such as pure water or an electrolytic solution. To ensure liquid stability, evaporation and condensation of the fluid 1570 may be considered. Evaporation and condensation may be negligible at the confined nanoscale volumes. Evaporation and condensation may be controlled by manipulating vapor pressure, surface treatment, temperature, and the like.

The material of the diffraction grating structure 1540 may be selected to have an index of refraction that substantially matches the index of refraction of the fluid 1570. Because polar fluid typically has a low refractive index of about 1.33, it may be technologically challenging to produce a diffraction grating structure 1540 that has a matching index of refraction. Some new techniques, such as oblique-angle deposition, can produce films of silicon dioxide with very low refractive indices (e.g., less than about 1.1).

In some embodiments, the wetting properties of the surfaces of the diffractive grating 1500 may be tailored by chemical treatment for optimal operation. For example, the floor of the chamber (i.e., the surface of the first transparent electrode 1520) may be tailored to have the highest wetting affinity, so that by default, in the "on" state, the fluid 1570 may adhere to the floor of the chamber. Untreated ITO may have an acceptable wetting property. The sides of the diffraction grating structure 1540 may be tailored to have neutral wetting surfaces, so that there may be minimal impedance to the fluid movement up and down the channels 1544. The top of the chamber (i.e., the surface of the second transparent electrode 1550) may be tailored to be hydrophobic, so that the fluid 1570 does not adhere to the top to enable rapid switching between "on" and "off."

Electroosmosis may be a highly effective transport mechanism at the nanoscale. One charge species may be attracted to the nanochamber walls, while the opposite fluid charge species may be repelled. Each species may form a layer (referred to as an electric double layer, or EDL) in the fluid. When the attracted layer of the EDL is on the order of the nanopore, there may be a net charge concentration within the nanopore, and the fluid within the nanopore will experience locomotion under an applied electric field.

To maintain an electroosmotic flow, typically Faradaic reactions (reduction or oxidation) may be utilized at the electrodes to equilibrate the species. However, the diffractive grating 1500 does not warrant continuous flow in some embodiments, only electrostatic push or pull displacements. Therefore, Faradaic reactions may not be utilized in some embodiments. Electrolysis may occur, but can be mitigated by electrode materials selection. For example, electrolytes may be added to water to promote electroosmotic forces.

In some embodiments, the distance between the first transparent electrode 1520 and the second transparent electrode 1550 may be about 300 nm. A 3 V voltage applied between the first transparent electrode 1520 and the second transparent electrode 1550 may generate an electric field of about 10 MV/m. It may be noted that the dielectric strength of air is about 3 MV/m, the dielectric strength of water is about 35-70 MV/m, and the dielectric strength of glass is about 9-14 MV/m. For a 5 mm×5 mm and 50% duty cycle grating, 2.5 nanoliters of fluid may need to be displaced to submerge the 200 nm height of gratings.

In some embodiments, if a complete circuit needs to be established to initiate electroosmosis, small micron-dimension channels can be formed by selective wetting treatment on small portions of the gratings.

Figure 18A:
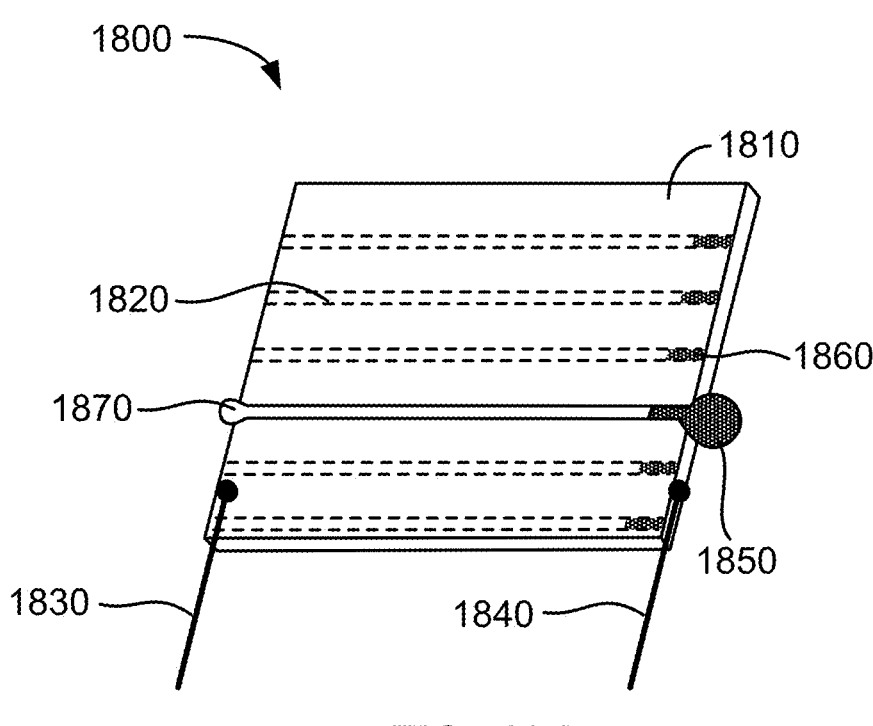
FIGS. 18A and 18B illustrate schematically a dynamically switchable diffraction grating based on the electroosmosis effect according to some embodiments.
Figure 18B:
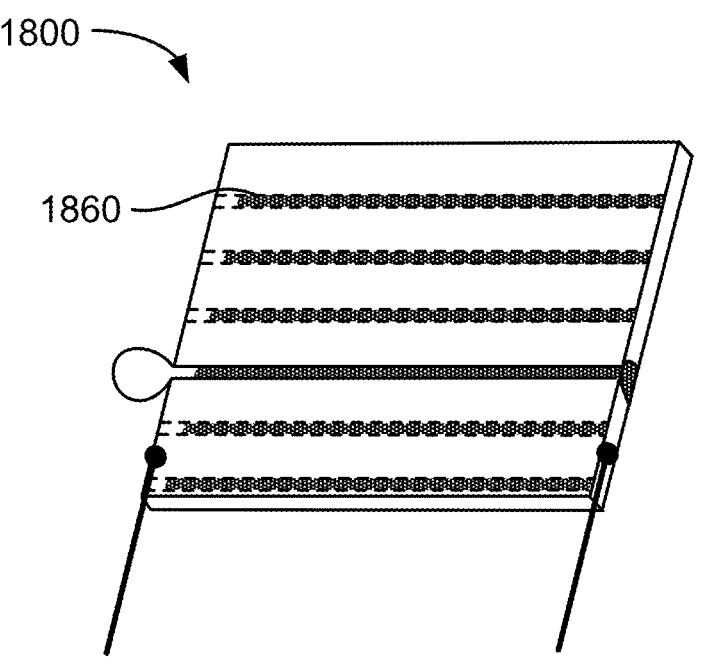

FIGS. 18A and 18B illustrate schematically a dynamically switchable diffraction grating 1800 based on the electroosmosis effect according to some embodiments of the present invention. The diffraction grating 1800 includes a substrate 1810 that includes a plurality of channels 1820 extending laterally across a surface of the substrate 1810. The plurality of channels is arranged as a periodic array. Each of the plurality of channels 1820 may be filled with a first fluid 1870 that has an index of refraction substantially matching the index of refraction of the substrate 1810. A fluid reservoir 1850 may be formed at the second end 1840 of each channel 1820 for holding a quantity of a second fluid 1860. The second fluid 1860 may have an index of refraction different from the index of refraction of the substrate 1810. The second fluid 1860 may be immiscible with the first fluid 1870.

The diffraction grating 1800 further includes a first electrode 1830 formed on an edge of the substrate 1810 abutting a first lateral end of the plurality of channels 1820, and a second electrode 1840 formed on an opposite edge of the substrate 1810 abutting a second lateral end of the plurality of channels 1820. Absent an electric potential between the first electrode 1830 and the second electrode 1840, the quantity of the second fluid 1860 may remain in the reservoir 1850 at the second end of each channel 1820, leaving each channel 1820 filled with the first fluid 1870, as illustrated in FIG. 18A. Because the index of refraction of the first fluid 1870 substantially matches to the index of refraction of the substrate 1810, the diffraction grating 1800 is in an "off" state, as it may not diffract light incident thereon.

When an electric potential is applied between the first electrode 1830 and the second electrode 1840, the quantity of the second fluid 1860 may be drawn toward the first end of each respective channel 1820 via electroosmosis to fill up the respective channel 1820, while displacing the first fluid 1870 from the respective channel 1820, as illustrated in FIG. 18B. Because the index of refraction of the second fluid 1860 is different from the index of refraction of the substrate 1810, the diffraction grating 1800 is in an "on" state. When the electric potential is removed, the quantity of the second fluid 1860 may retract to the reservoir 1850 at the second end of each channel 1820, letting the first fluid 1870 fill each channel 1820 again. Therefore, in this manner, by switching the electric potential between the first electrode 1830 and the second electrode 1840 on and off, the diffraction grating 1800 may be turned on and off accordingly.

Figure 19A:
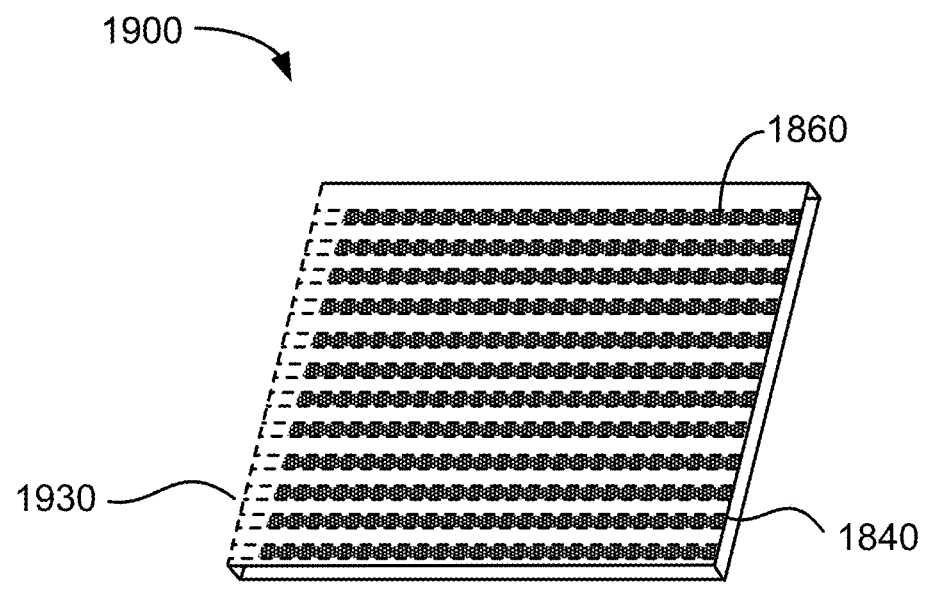
FIGS. 19A and 19B illustrate schematically a dynamically switchable diffraction grating based on the electroosmosis effect according to some other embodiments.
Figure 19B:
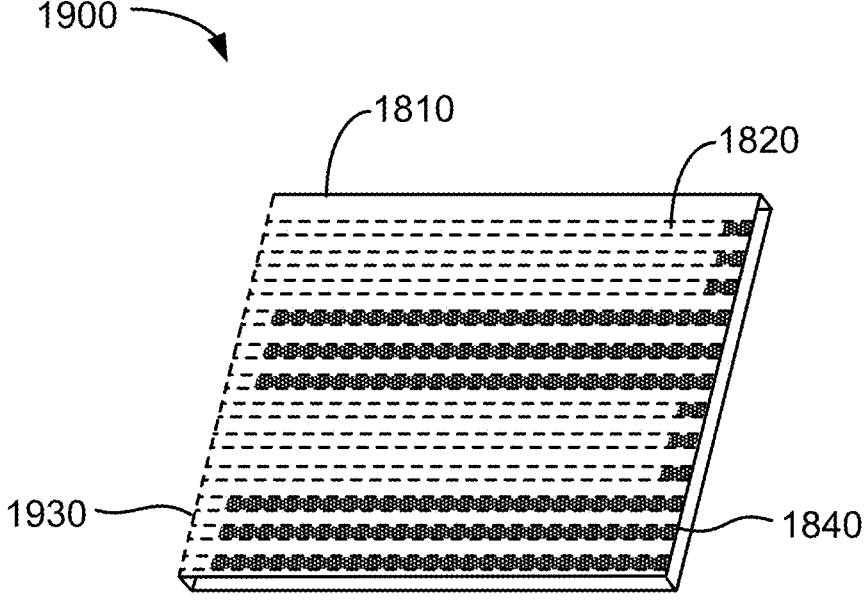

FIGS. 19A and 19B illustrate schematically a dynamically switchable diffraction grating 1900 based on the electroosmosis effect according to some other embodiments of the present invention. The dynamically switchable diffraction grating 1900 is similar to the dynamically switchable diffraction grating 1800 illustrated in FIGS. 18A and 18B except that, instead of having a single first electrode 1830, it has a plurality of first electrodes 1930, each first electrode 1930 coupled to a respective channel 1820. Therefore, each channel 1820 may be individually controlled by turning on or off an electric potential between the respective first electrode and the second electrode 1840.

For instance, in the example illustrated in FIG. 19A, every channel 1820 is filled with the second fluid 1860, forming a diffraction grating with a period equal to the spacing between adjacent channels 1820. On the other hand, in the example illustrated in FIG. 19B, every other group of three adjacent channels 1820 is filled with the second fluid 1860, forming a diffraction grating with a period that is six times of the spacing between adjacent channels 1820. Therefore, the periodicity of the grating may be dynamically changed by modulating the electric potential applied to each channel 1820.

As described above, diffractive gratings in which grating parameters, such as grating pitch or grating vector, can be dynamically varied may allow for eyepiece configurations in which only one dynamically variable grating is utilized to service all colors (e.g., RGB colors) and a continually variable depth. Depending on the range and response time, these dynamically variable gratings may be utilized for fast scanning of an input beam in one axis or slow scanning of the input beam in the orthogonal axis.

Figure 20:
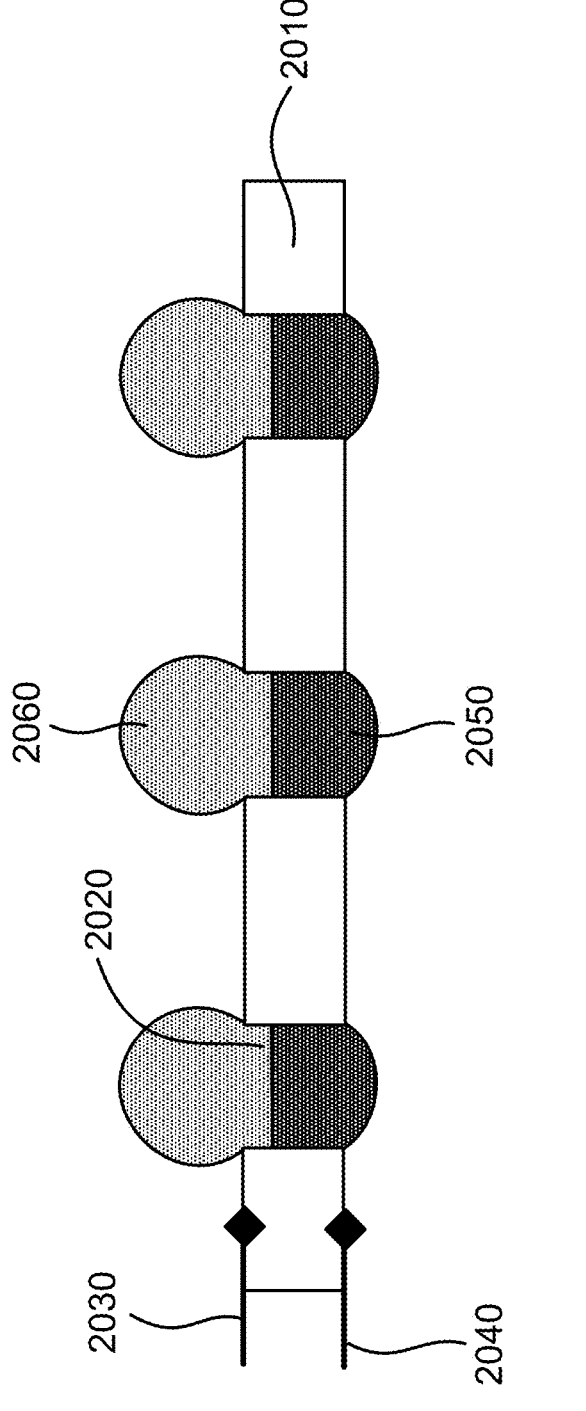
FIG. 20 illustrates schematically a cross-sectional view of a dynamic diffraction grating according to some embodiments.

FIG. 20 illustrates schematically a cross-sectional view of a dynamic diffraction grating 2000 according to some embodiments of the present invention. The diffraction grating 2000 includes a substrate 2010 that has a plurality of channels 2020 arranged as a periodic array (extending perpendicular to the page). The dynamic diffraction grating 2000 further includes a first electrode 2030 and a second electrode 2040 formed on opposite surfaces of the substrate

Figure 21:
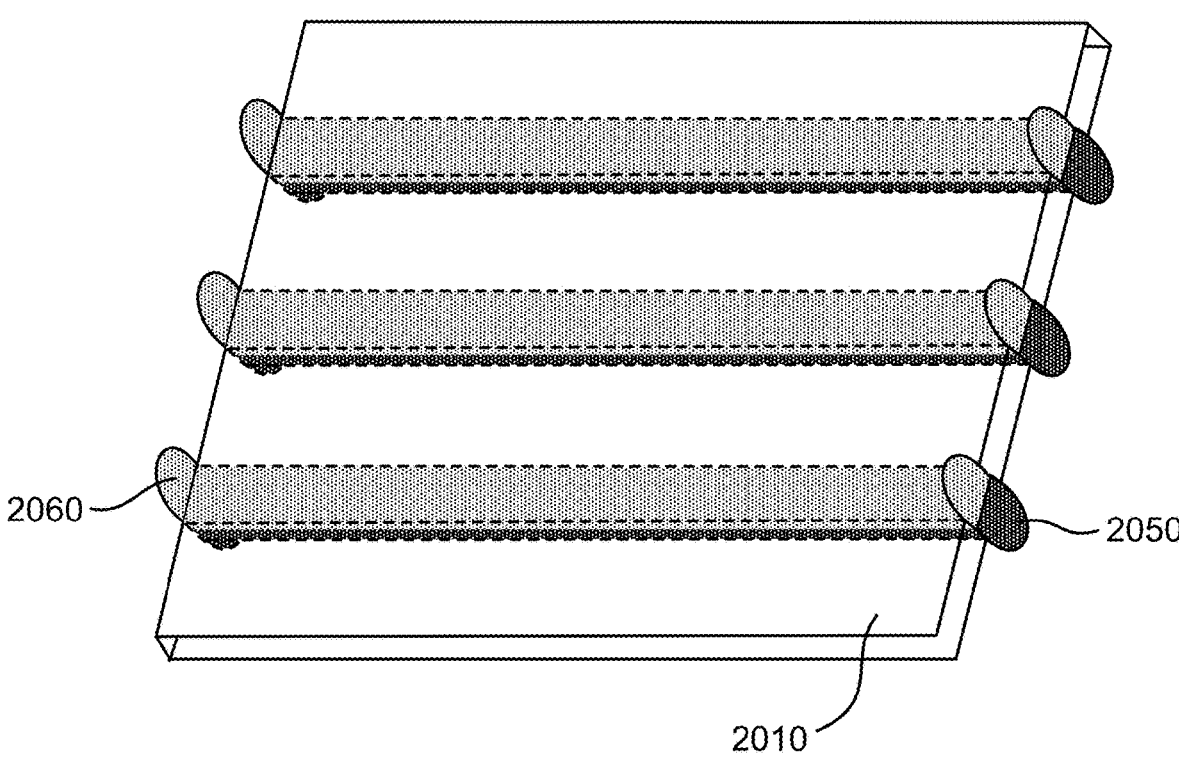
FIG. 21 shows a perspective view of the dynamic diffraction grating shown in FIG. 20 according to some embodiments.

2010. A quantity of a first fluid 2050 may be disposed in each channel 2020. A quantity of a second fluid 2060 may be disposed in each channel 2020 on top of the first fluid 2050. The second fluid 2060 may be immiscible with the first fluid 2050. FIG. 21 shows a perspective view of the dynamic diffraction grating 2000.

Absent an electric potential between the first electrode 2030 and the second electrode 2040, the first fluid 2050 may remain in the bottom portion of each channel 2020, thus allowing the second fluid 2060 to fill each channel 2020. By applying an electric potential between the first electrode 2030 and the second electrode 2040, the first fluid 2050 may be drawn up in each channel 2020, thus displacing the first fluid 2060. In some embodiments, the dynamic diffraction grating 2000 may include a reservoir (not shown) under each channel 2020 for holding the first fluid 2050. There may be a plurality of holes or a continuous slit at the bottom of each channel 2020 connecting each channel 2020 with the reservoir, so that the first fluid 2050 may be drawn up the channel 2020 when the electric potential is applied, and may retract back to the reservoir when the electric potential is removed.

The first fluid 2050 may have a first index of refraction, and the second fluid 2060 may have a second index refraction different from the first index of refraction. Thus, the diffraction grating 2000 may have a first diffraction state (e.g., in terms of diffraction angles) when the electrical potential is off, and a second diffraction state when the electric potential is on. For example, in the first diffraction state, the diffraction grating 2000 may have a first diffraction angle for a specific wavelength; and in the second diffraction state, the diffraction grating 2000 may have a second diffraction angle different from the first diffraction angle for the specific wavelength. Therefore, by turning on and off the electric potential, the diffraction grating 2000 may be switched between the first diffraction state and the second diffraction state dynamically.

Figure 22:
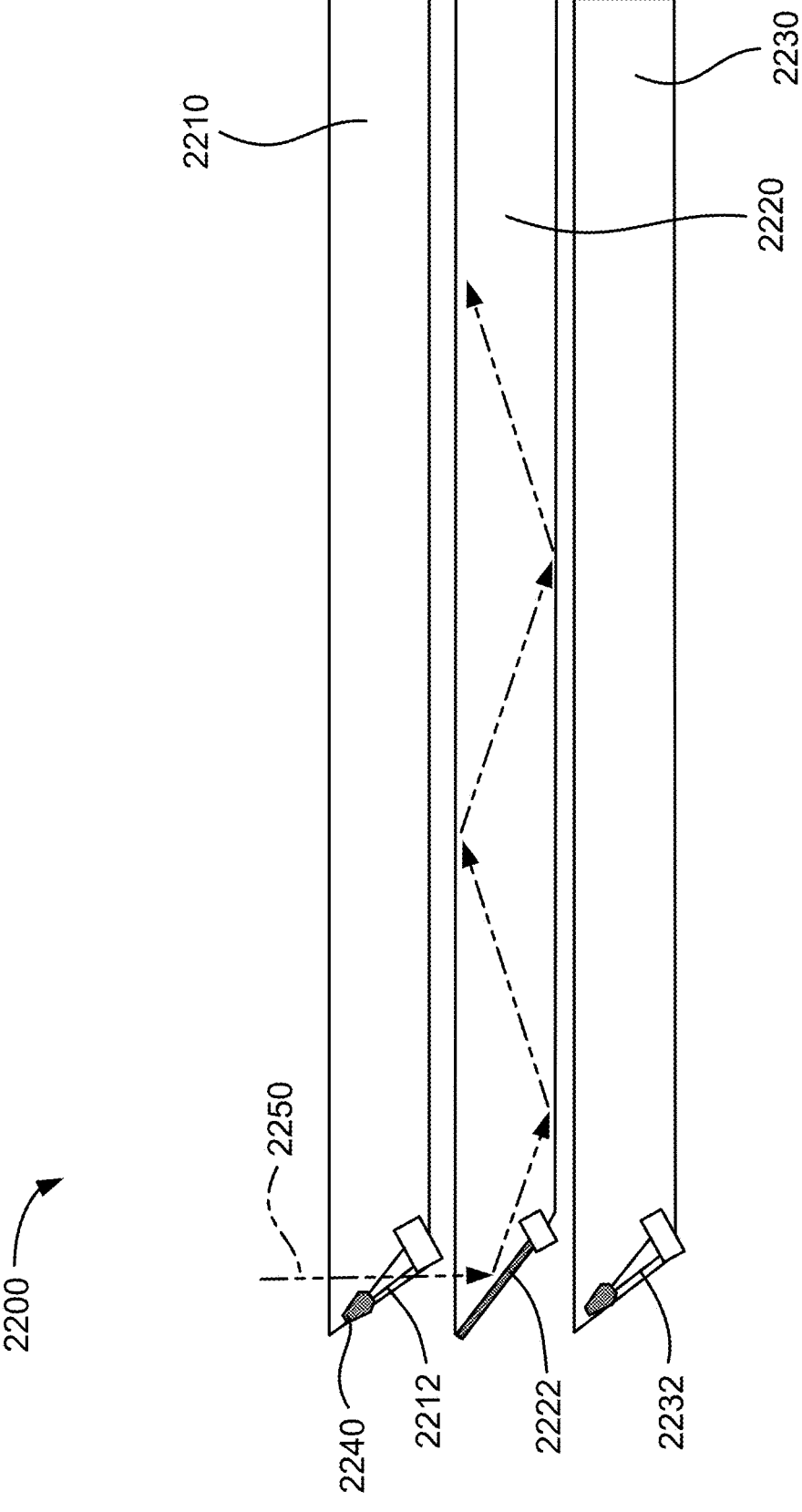
FIG. 22 illustrates schematically an eyepiece with dynamically switchable optics based on nanofluidics according to some embodiments.

FIG. 22 illustrates schematically an eyepiece 2200 with dynamically switchable optics based on nanofluidics according to some embodiments of the present invention. The eyepiece 2200 may include a first planar waveguide 2210, a second planar waveguide 2220 positioned behind the first waveguide 2210, and a third planar waveguide 2230 positioned behind the second waveguide 2220. One side of each of the first waveguide 2210, the second waveguide 2220, and the third waveguide 2230 (e.g., the left side of each waveguide as illustrated in FIG. 22) may have a facet that is slanted at an angle with respect to a plane of each respective waveguide. The slanted facet on each waveguide may be positioned in a region where an input light beam 2250 is incident on the respective waveguide.

A first nanofluidics channel 2212 may be formed on the slanted facet of the first waveguide 2210; a second nanofluidics channel 2222 may be formed on the slanted facet of the second waveguide 2220; and a third nanofluidics channel 2232 may be formed on the slanted facet of the third waveguide 2220. A fluid 2240 may be pumped into or out of each of the first nanofluidics channel 2212, the second nanofluidics channel 2222, and the third nanofluidics channel 2232 dynamically using the principal of electroosmosis. When the fluid 2240 is absent in a nanofluidics channel 2212, 2222, or 2232, the incident light beam 2250 may be transmitted through the corresponding waveguide at the facet. For instance, in the example illustrated in FIG. 22, the incident light beam 2250 is transmitted through the first waveguide 2210 at the facet and is incident on the second waveguide 2220.

In some embodiments, the fluid 2240 may be highly reflective (e.g., a metallic fluid), such that, when the fluid 2240 is pumped into a nanofluidics channel 2212, 2222, or 2232, the incident light beam 2250 may be reflected at the waveguide-fluid interface. For instance, in the example illustrated in FIG. 22, the second nanofluidics channel 2222 is filled with the fluid 2240. Consequently, the light beam 2250 incident on the second waveguide 2220 may be reflected at the waveguide-fluid interface, and may be propagated in the second waveguide 2220 by total internal reflection (TIR). In some other embodiments, the fluid 2240 may have an index of refraction lower than the index of refraction of the waveguide such that total internal reflection may occur at the waveguide-fluid interface. Therefore, by dynamically pumping the fluid 2240 in and out of each nanofluidics channel 2212, 2222, or 2232, the incident light beam 2250 can be selectively coupled into a corresponding waveguide 2210, 2220, or 2230. Thus, the nanofluidics channels 2212, 2222, and 2232 may serve as a dynamically actually in-coupling optical elements for the eyepiece 2200.

Figure 23:
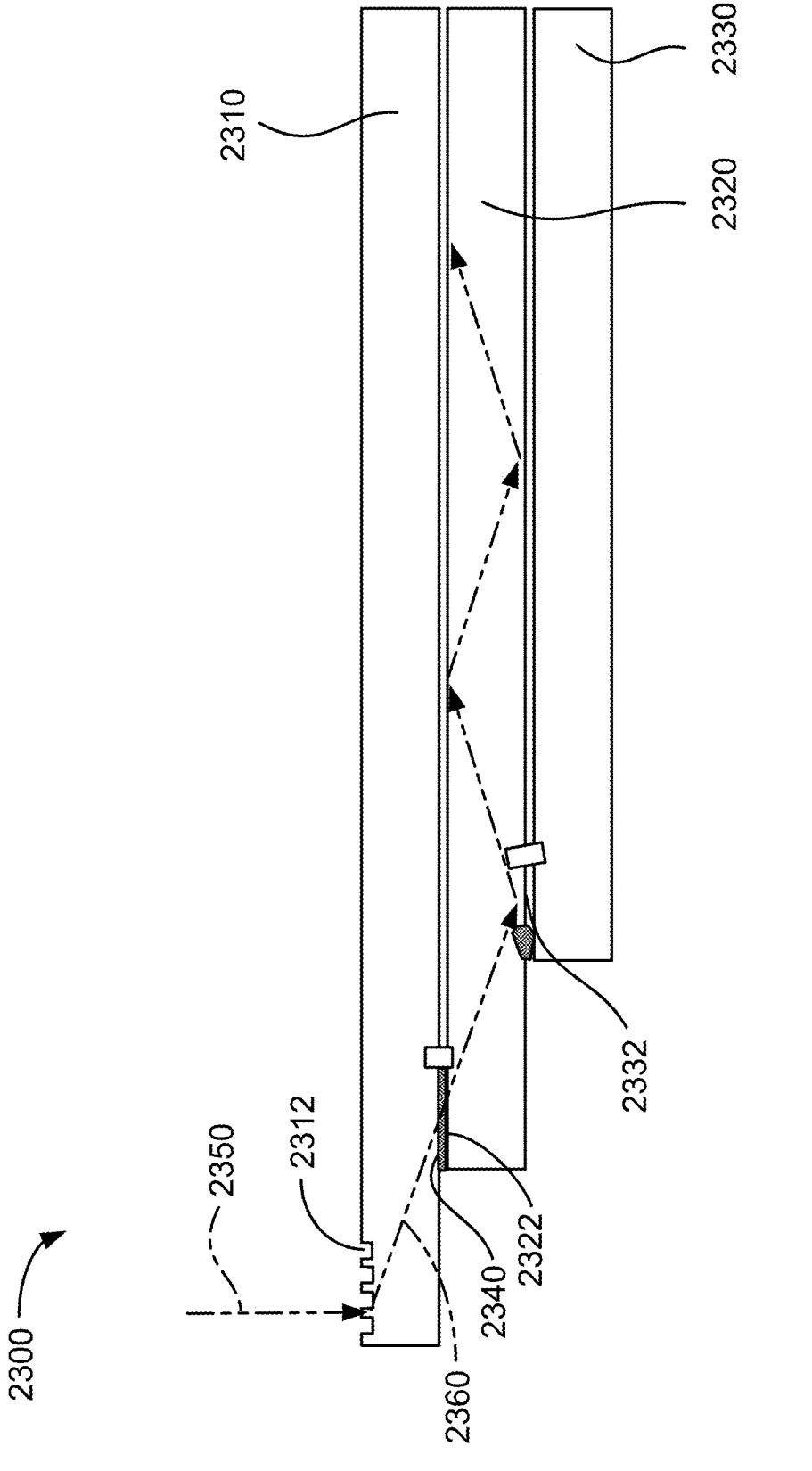
FIG. 23 illustrates schematically an eyepiece with dynamically switchable optics based on nanofluidics according to some other embodiments.

FIG. 23 illustrates schematically an eyepiece 2300 with dynamically switchable optics based on nanofluidics according to some other embodiments of the present invention. The eyepiece 2300 may include a first planar waveguide 2310, a second planar waveguide 2320 positioned behind the first waveguide 2310, and a third planar waveguide 2330 positioned behind the second waveguide 2320. A diffractive optical element (DOE) 2312 may be formed on a surface of the first waveguide 2310. The DOE 2312 may be positioned in a region where an input light beam 2350 is incident on the first waveguide 2310. The DOE 2312 may be configured to diffract a portion of the incident light beam 2350 into the first waveguide 2310 as a diffracted light beam 2360 at a diffraction angle, as illustrated in FIG. 23.

The eyepiece 2300 further includes a first nanofluidics channel 2322 positioned between the first waveguide 2310 and the second waveguide 2320, and a second nanofluidics channel 2332 positioned between the second waveguide 2320 and the third waveguide 2330. A fluid 2340 may be pumped into or out of each of the first nanofluidics channel 2322 and the second nanofluidics channel 2332 dynamically using the principal of electroosmosis. The fluid 2340 may have an index of refraction higher than the index of refraction of the waveguide so that, when the fluid 2340 is present in a nanofluidics channel 2322 or 2332, the diffracted light beam 2360 incident on the waveguide-fluid interface may be transmitted. On the other hand, when the fluid 2340 is absent in a nanofluidics channel 2322 or 2332, the diffracted light beam 2360 incident on the interface between the waveguide and the empty nanofluidics channel may undergo total internal reflection (TIR) and be propagated in a corresponding waveguide.

For instance, in the example illustrated in FIG. 23, the first nanofluidics channel 2322 is filled with the fluid 2340 while the second nanofluidics channel 2332 is empty (or partially empty). Thus, the diffracted light beam 2360 incident on the interface between the first waveguide 2210 and the fluid 2340 is transmitted into the second waveguide 2320; and the transmitted light beam 2360 incident on the interface between the second waveguide 2320 and the empty second nanofluidics channel 2332 is reflected, and subsequently propagated in the second waveguide 2320 by total internal reflection (TIR). Therefore, by dynamically pumping the fluid 2340 in and out of each nanofluidics channel 2322, 2222 and 2332, the incident light beam 2350 can be selectively coupled into a corresponding waveguide 2310, 2320, or 2330.

Figure 24:
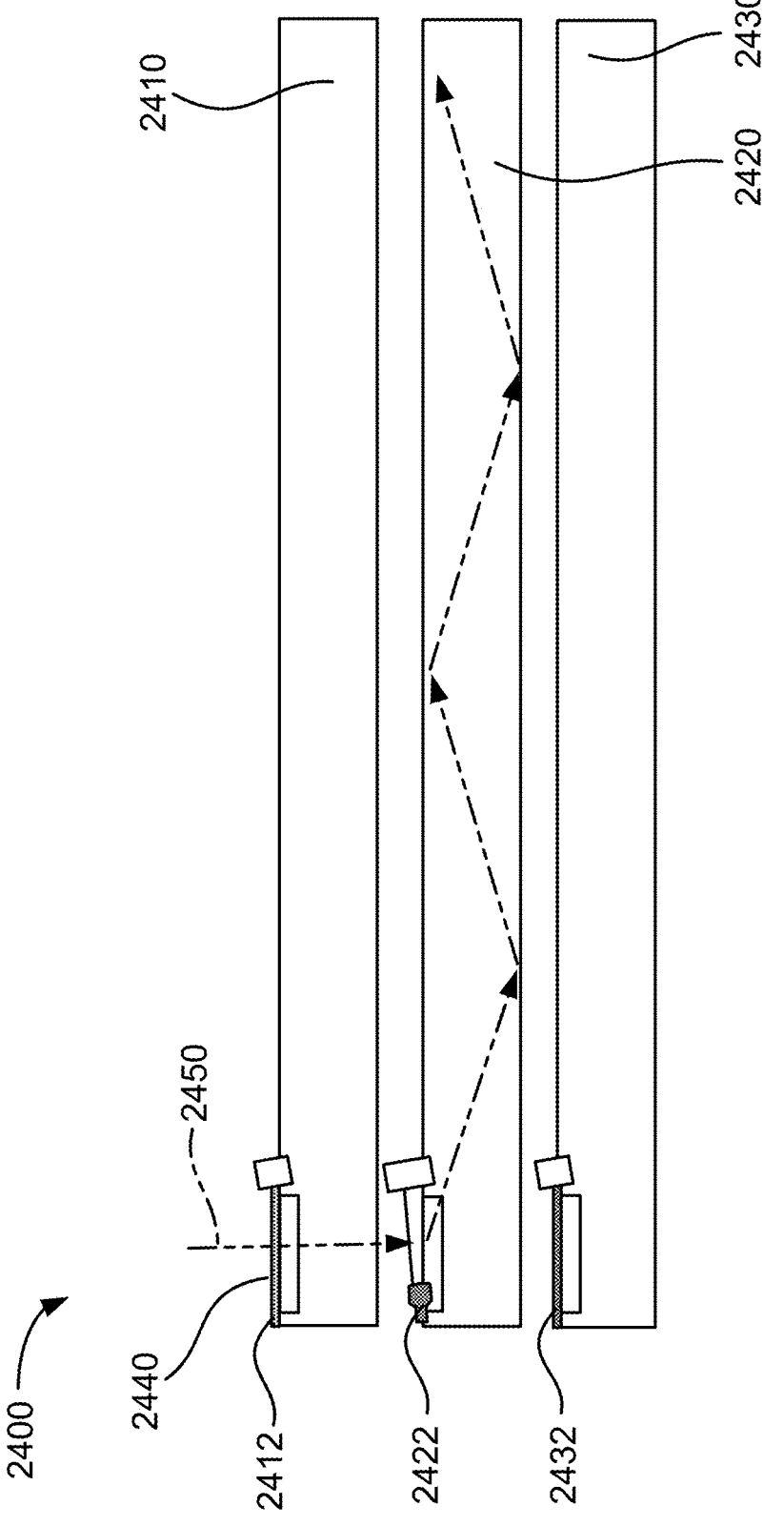
FIG. 24 illustrates an eyepiece with dynamically actuable diffractive gratings based on nanofluidics according to some embodiments.

FIG. 24 illustrates an eyepiece 2400 with dynamically actuable diffractive gratings based on nanofluidics according to some embodiments of the present invention. The eyepiece 2400 may include a first planar waveguide 2410, a second planar waveguide 2420 positioned behind the first waveguide 2410, and a third planar waveguide 2430 positioned behind the second waveguide 2420. A first dynamic diffraction grating 2412 may be formed on a surface of the first waveguide 2410. The first dynamic diffraction grating 2412 may be positioned in a lateral region where an input light beam 2450 is incident on the first waveguide 2410. A second dynamic diffraction grating 2422 may be formed on a surface of the second waveguide 2420. A third dynamic diffraction grating 2432 may be formed on a surface of the third waveguide 2430. The second dynamic diffraction grating 2422 and the third dynamic diffraction grating 2432 are positioned in a lateral position that is substantially aligned with the first dynamic diffraction grating 2412.

Each of the first dynamic diffraction grating 2412, the second dynamic diffraction grating 2422, and the third dynamic diffraction grating 2432 may be dynamically turn on or off based on the electroosmosis effect, similar to those illustrated in FIGS. 18A and 18B and described above. For instance, in the example illustrated in FIG. 24, the first dynamic diffraction grating 2412 is turned off by filling the channels of the diffraction grating 2422 with an index-matching fluid 2440. Thus the incident light beam 2450 is transmitted by the first dynamic diffraction grating 2412 and is incident on the second waveguide 2420. The second dynamic diffraction grating 2422 is turned on by retracting the index-matching fluid 2440 from the channels to the left side. Thus, the light beam 2450 incident on the second dynamic diffraction grating 2422 is diffracted by the second dynamic diffraction grating 2422 and is coupled into the second waveguide 2420, and subsequently propagated in the second waveguide 2420 by total internal reflection (TIR). Therefore, by dynamically turning on or off each of the first dynamic diffraction grating 2412, the second dynamic diffraction grating 2422, and the third dynamic diffraction grating 2432, the incident light beam 2450 can be selectively coupled into a corresponding waveguide 2410, 2420, or 2430. Each of the first dynamic diffraction grating 2412, the second dynamic diffraction grating 2422, and the third dynamic diffraction grating 2432 may serve as an ICG for a corresponding waveguide 2410, 2420, or 2430.

Figure 25:
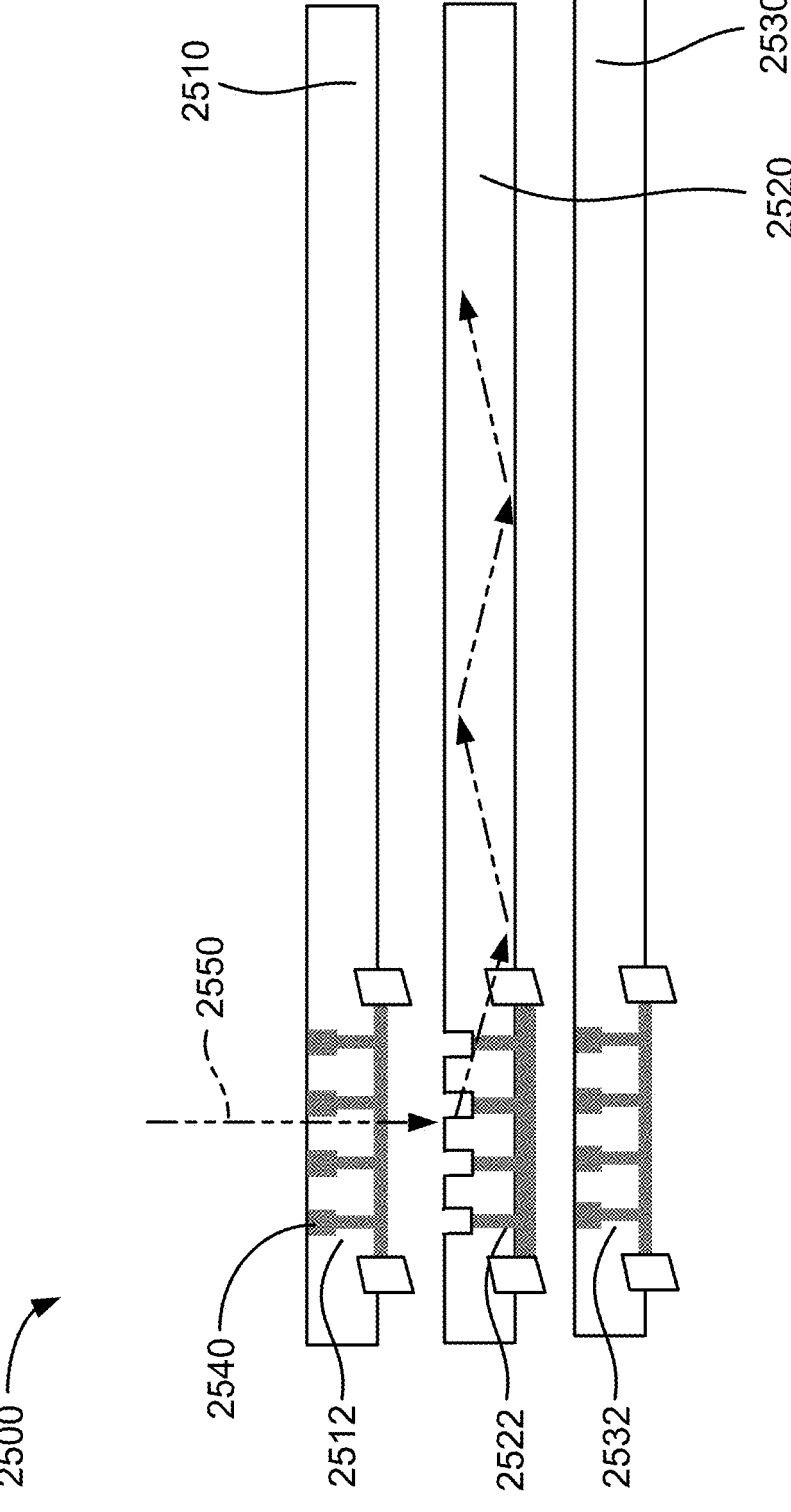
FIG. 25 illustrates an eyepiece with dynamically actuable diffractive gratings based on nanofluidics according to some other embodiments.

FIG. 25 illustrates an eyepiece 2500 with dynamically actuable diffractive gratings based on nanofluidics according to some other embodiments of the present invention. The eyepiece 2400 may include a first planar waveguide 2510, a second planar waveguide 2520 positioned behind the first waveguide 2510, and a third planar waveguide 2530 positioned behind the second waveguide 2520. A first dynamic diffraction grating 2512 may be formed on a surface of the first waveguide 2510. The first dynamic diffraction grating 2512 may be positioned in a lateral region where an input light beam 2550 is incident on the first waveguide 2510. A second dynamic diffraction grating 2522 may be formed on a surface of the second waveguide 2520. A third dynamic diffraction grating 2532 may be formed on a surface of the third waveguide 2530. The second dynamic diffraction grating 2522 and the third dynamic diffraction grating 2532 are positioned in a lateral position that is substantially aligned with the first dynamic diffraction grating 2512.

Each of the first dynamic diffraction grating 2512, the second dynamic diffraction grating 2522, and the third dynamic diffraction grating 2532 may be dynamically turn on or off based on the electroosmosis effect, similar to those illustrated in FIGS. 20 and 21 and described above. For instance, in the example illustrated in FIG. 25, the first dynamic diffraction grating 2512 is turned off by drawing an index-matching fluid 2540 up to fill the channels of the first diffraction grating 2512. Thus the incident light beam 2550 is transmitted by the first dynamic diffraction grating 2512 and is incident on the second waveguide 2520. The second dynamic diffraction grating 2522 is turned on by lowering the index-matching fluid 2540 from the channels. Thus, the light beam 2550 incident on the second dynamic diffraction grating 2522 is diffracted by the second dynamic diffraction grating 2522 and is coupled into the second waveguide 2520, and subsequently propagated in the second waveguide 2520 by total internal reflection (TIR). Therefore, by dynamically turning on or off each of the first dynamic diffraction grating 2512, the second dynamic diffraction grating 2522, and the third dynamic diffraction grating 2532, the incident light beam 2550 can be selectively coupled into a corresponding waveguide 2510, 2520, or 2530. Each of the first dynamic diffraction grating 2512, the second dynamic diffraction grating 2522, and the third dynamic diffraction grating 2532 may serve as an ICG for a corresponding waveguide 2510, 2520, or 2530.

Electrowetting is the modification of the wetting properties of a surface (which may be typically hydrophobic) with an applied electric field. An insulator layer is formed on a conductive substrate. A drop of fluid is then placed on a surface of the insulator layer. Absent any electric potential between the drop of and the conductive substrate, the surface of the insulator layer is hydrophobic, therefore there is relatively little surface wetting. When a non-zero electric potential is applied between the drop of fluid and the conductive substrate, the surface of the insulator layer becomes hydrophilic, therefore the drop of fluid wets the surface of the insulator layer. Using this phenomenon, manipulations of discrete droplets on a two-dimensional grid (digital microfluidics) have been demonstrated.

Photo-electrowetting may be observed by replacing the conductive substrate with a semiconductor substrate to form a liquid/insulator/semiconductor stack. By shining light on the semiconductor substrate through the insulator (which may be transparent), the semiconductor substrate may become conductive via photoconductivity. Thus, the surface of the insulator may become hydrophilic with an application of an electric potential between the drop of fluid and the semiconductor substrate.

Figure 26A:
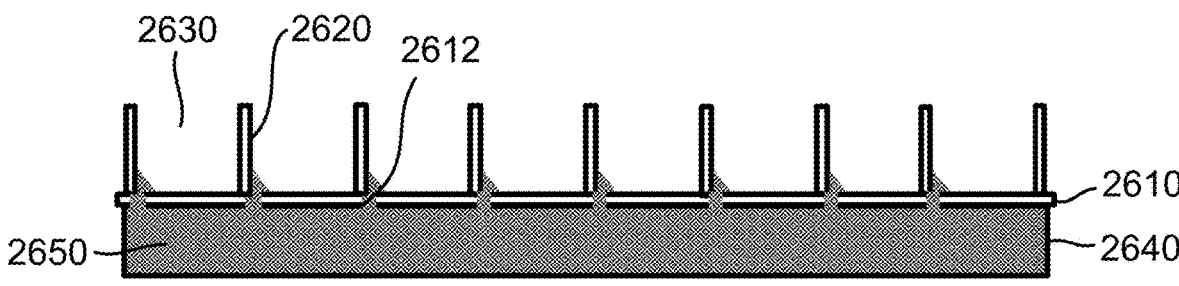
FIGS. 26A-26D illustrate schematically some dynamically switchable diffraction gratings based on electrowetting according to various embodiments.

FIGS. 26A-26D illustrate schematically some dynamically switchable diffraction gratings using electrowetting as their operating principle according to various embodiments of the present invention. Referring to FIG. 26A, a dynamically switchable diffraction grating includes a base plate 2610 and a plurality of walls 2620 extending upward from a surface of the base plate 2610 (extending in the direction perpendicular to the page). The plurality of walls 2620 define a plurality of longitudinal channels 2630 (extending in the direction perpendicular to the page). The channels 2630 may have a width in the order of about 200 nm. The width of the channels 2630 may be varied depending on the wavelength of light. A fluid reservoir 2640 is positioned under the base plate 2610 for holding an amount of a fluid 2650. The base plate 2610 may have a hole or a slit 2612 under each respective channel 2630, so that the fluid 2650 may flow into the respective channel 2630.

The base plate 2610 may include a conductive substrate and an insulating layer formed thereon. The insulating layer, which forms the bottom of the channels 2630, may be typically hydrophobic. The walls 2620 of the channels 2630 may also be typically hydrophobic. Depending on the materials of the insulating layer and the walls 2620, the surface of the insulating layer and the surface of the walls 2620 may be chemically treated to behave as hydrophobic. Therefore, the fluid 2650 may typically stays in the reservoir 2640 and not in the channels 2630, as illustrated in FIG. 26A. An electric potential may be applied between each respective wall 2620 and the conductive substrate of the base plate 2610 to change the wetting property of the respective wall and the bottom a corresponding channel 2630 from hydrophobic to hydrophilic. Therefore, by controlling the electric potential applied to each respective wall 2620, individual channels 2630 may be selectively filled with the fluid 2650.

Figure 26B:
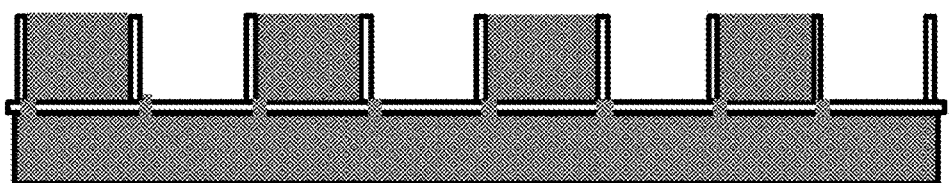
Figure 26C:
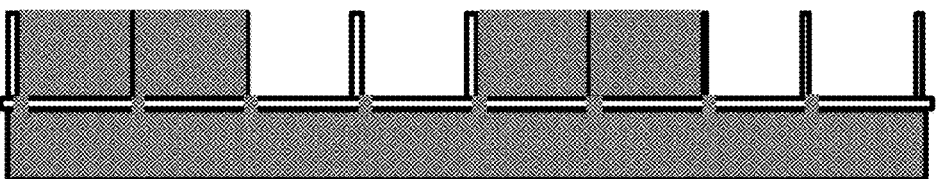

For instance, in the example illustrated in FIG. 26B, every other channel 2630 is filled with the fluid 2650, forming a diffraction grating with a period of twice the width of each channel 2630. In the example illustrated in FIG. 26C, every other pairs of adjacent channels 2630 is filled with the fluid 2650, forming a diffraction grating with a period of four times the width of each channel 2630. Therefore, the periodicity of the grating may be dynamically changed by modulating the electric potential applied to each wall 2620. According to some embodiments, one dynamically variable grating may be used to service all colors (e.g., the RGB colors) and a continually variable depth. Depending on the range and response time, these dynamically variable gratings may be utilized for fast scanning of an input beam in one axis or slow scanning of the input beam in the orthogonal axis.

Figure 26D:
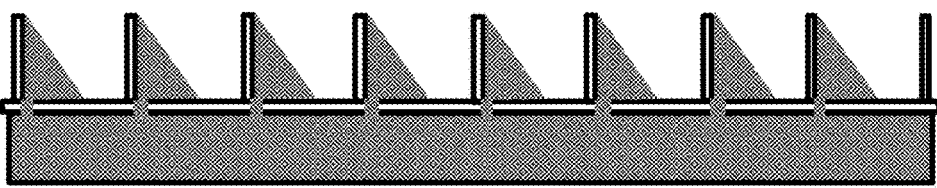

Referring to FIG. 26D, in some embodiments, one side of each wall 2620 may be configured to have a permanent hydrophobic surface, so that the fluid may adhere only to the other side of the wall 2620. The bottom of each channel 2630 may be configured to have a differential electrowetting property laterally from one side of the channel to the other. Therefore, the fluid 2650 that fills a channel 2630 may have a triangle cross section. In the example illustrated in FIG. 26C, each channel 2630 is partially filled with the fluid 2650 to form a saw-teeth shaped diffraction grating with a period equal to the width of each channel 2630. The saw-teeth shaped diffraction grating may serve as a blazed grating. In some embodiments, the fluid may be pumped in or out of the channels 2630 by applying a pressure.

Figure 27A:
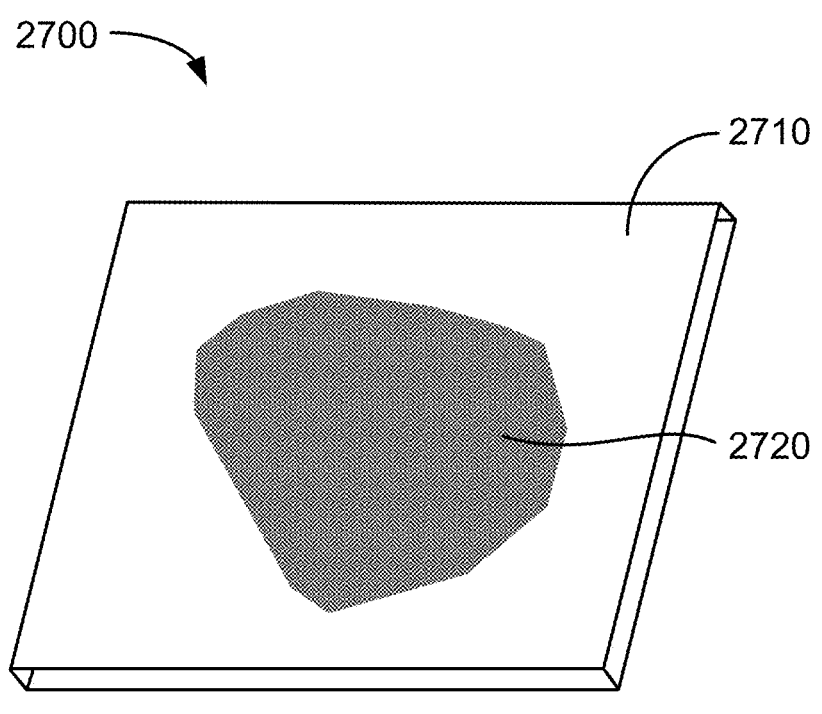
FIGS. 27A-27B illustrate schematically a dynamic diffraction grating based on photo-electrowetting according to some embodiments.
Figure 27B:
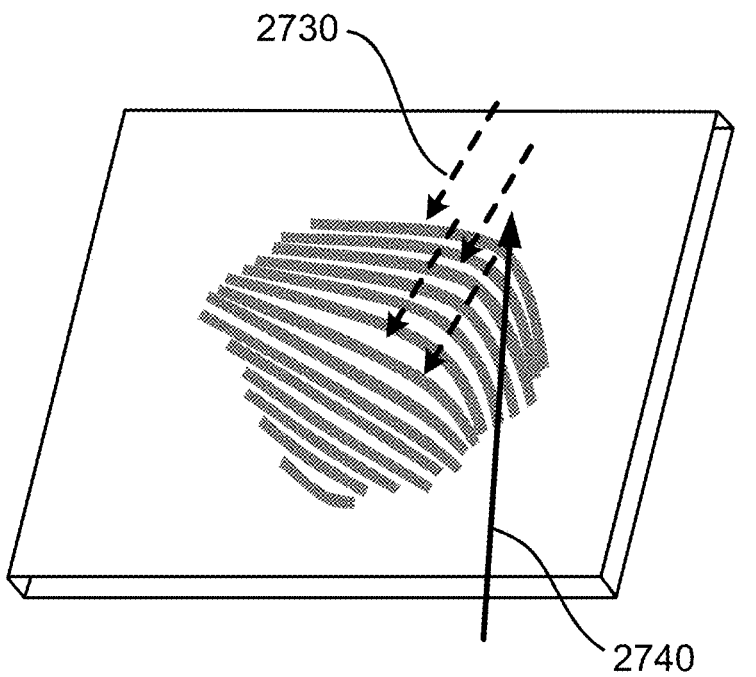

FIGS. 27A-27B illustrate schematically a dynamic diffraction grating 2700 based on photo-electrowetting according to some embodiments of the present invention. The dynamic diffraction grating 2700 includes a substrate 2710 that may include an insulator formed on a semiconductor. A quantity of a fluid 2720 may be placed on the surface of the substrate 2710. By shining a light beam 2730 on the substrate in conjunction with applying an electric field between the fluid 2720 and the substrate 2730, the wetting property of the substrate 2710 may be changed from hydrophobic to hydrophilic, or vice versa. In some embodiments, the light beam 2730 may have an intensity pattern. Accordingly, the quantity of the fluid 2720 may form a pattern on the substrate 2710 corresponding to the intensity pattern, such as the stripes illustrated in FIG. 27B. The stripes of the fluid 2720 may function as a diffraction grating. For example, an intensity pattern of regularly spaced stripes may be formed as interference fringes of two coherent light beams. In this manner, the diffraction grating 2700 may be dynamically turned on or off by turning the light beam on or off. Additionally or alternatively, the periodicity or the orientation of the diffraction grating 2700 may be dynamically changed by changing the intensity pattern of the light beam 2730.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A dynamically actuable lens comprising:
a substrate having a surface;
a metasurface diffractive optical element (DOE) formed on the surface of the substrate, wherein the metasurface DOE includes a plurality of raised portions protruding above the surface, wherein the metasurface DOE defines a plurality of recesses between adjacent raised portions;
a movable cover overlying the metasurface DOE and comprising a hydrophilic material;
a quantity of a fluid disposed on the movable cover; and
a drive mechanism coupled to the movable cover, the drive mechanism configured to:
upon receiving a control signal in a first state, move the movable cover toward the metasurface DOE to displace a portion of the quantity of the fluid into the plurality of recesses, thereby rendering the metasurface DOE in an "off" state; and
upon receiving a control signal in a second state, move the movable cover away from the metasurface DOE, causing the portion of the quantity of the fluid retracting from the plurality of recesses, thereby rendering the metasurface DOE in an "on" state.

2. The dynamically actuable lens of claim 1 wherein the metasurface DOE comprises a hydrophobic material.

3. The dynamically actuable lens of claim 1 wherein the plurality of raised portions have a maximum traverse dimension less than 100 nanometers.

4. The dynamically actuable lens of claim 1 further comprising a light source optically coupled to the metasurface DOE, wherein the light source has a light source wavelength.

5. The dynamically actuable lens of claim 4 wherein the plurality of raised portions have a maximum transverse dimension less than the light source wavelength.

6. The dynamically actuable lens of claim 4 wherein the light source is a laser diode (LD) or a light emitting diode (LED).

7. The dynamically actuable lens of claim 1 wherein the quantity of the fluid is adhered to the movable cover.

8. The dynamically actuable lens of claim 1 wherein the quantity of the fluid and the movable cover have a natural affinity to each other.

9. The dynamically actuable lens of claim 1 wherein the quantity of the fluid has an index of refraction matching an index of refraction of the plurality of raised portions.

10. The dynamically actuable lens of claim 1 wherein the plurality of raised portions comprise positive or negative surface relief pattern diffractive lenses.

11. An eyepiece for projecting image light to an eye of a viewer for forming an image of virtual content, the eyepiece comprising:
a first planar waveguide configured to propagate light in a first wavelength range centered at a first wavelength;
a dynamically actuable diffractive optical element (DOE) formed on a first region of a surface of the first planar waveguide in a first lateral position and configured to receive image light incident thereon, the dynamically actuable DOE comprising:
a substrate having a surface;
a metasurface diffractive optical element (DOE) formed on the surface of the substrate, wherein the metasurface DOE includes a plurality of raised portions protruding above the surface, wherein the metasurface DOE defines a plurality of recesses between adjacent raised portions;
a movable cover overlying the metasurface DOE and comprising a hydrophilic material;
a quantity of a fluid disposed on the movable cover; and
a drive mechanism coupled to the movable cover, the drive mechanism configured to:
upon receiving a control signal in a first state, move the movable cover toward the metasurface DOE to displace a portion of the quantity of the fluid into the plurality of recesses, thereby rendering the metasurface DOE in an "off" state; and
upon receiving a control signal in a second state, move the movable cover away from the metasurface DOE, causing the portion of the quantity of the fluid retracting from the plurality of recesses, thereby rendering the metasurface DOE in an "on" state.

12. The eyepiece of claim 11 further comprising:
a second planar waveguide positioned substantially parallel to a plane of the first planar waveguide and configured to propagate light in a second wavelength range centered at a second wavelength different from the first wavelength; and
a second DOE formed on a region of a surface of the second planar waveguide in a second lateral position substantially aligned with the first lateral position, the second DOE configured to:
receive the image light in the "off" state; and
diffract a second portion of the image light into the second planar waveguide to be propagated therein.

13. The eyepiece of claim 12 wherein the second DOE comprises a quantity of a second fluid different from the fluid of the dynamically actuable DOE.

14. The eyepiece of claim 13 wherein the dynamically actuable DOE comprises a nanofluidic circuit including at least two fluids having different optical properties.

15. The eyepiece of claim 11 wherein the metasurface DOE comprises a hydrophobic material.

16. The eyepiece of claim 11 wherein the plurality of raised portions have a maximum traverse dimension less than 100 nanometers.

17. The eyepiece of claim 11 wherein the quantity of the fluid and the movable cover have a natural affinity to each other.

18. The eyepiece of claim 11 further comprising a light source having a light source wavelength and optically coupled to the metasurface DOE, wherein the plurality of raised portions have a maximum transverse dimension less than the light source wavelength.

19. The eyepiece of claim 18 wherein the light source is a laser diode (LD) or a light emitting diode (LED).

20. The eyepiece of claim 11 wherein the quantity of the fluid has an index of refraction matching an index of refraction of the plurality of raised portions.

* * * * *